US010504385B1

(12) United States Patent
Harris et al.

(10) Patent No.: US 10,504,385 B1
(45) Date of Patent: Dec. 10, 2019

(54) SYSTEMS AND METHODS FOR PROVIDING CREDIT COACHING

(71) Applicant: State Farm Mutual Automobile Insurance Company, Bloomington, IL (US)

(72) Inventors: Michael Harris, Bloomington, IL (US); Jacob Alt, Bloomington, IL (US); Jennifer Criswell Kellett, Bloomington, IL (US); Tracey Dunne, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 233 days.

(21) Appl. No.: 15/191,083

(22) Filed: Jun. 23, 2016

Related U.S. Application Data

(60) Provisional application No. 62/186,153, filed on Jun. 29, 2015, provisional application No. 62/289,697, filed on Feb. 1, 2016.

(51) Int. Cl.
*G09B 19/18* (2006.01)
*G06Q 40/02* (2012.01)
*G06Q 20/20* (2012.01)
*G09B 5/12* (2006.01)

(52) U.S. Cl.
CPC ............ *G09B 19/18* (2013.01); *G06Q 20/20* (2013.01); *G06Q 40/025* (2013.01); *G09B 5/125* (2013.01)

(58) Field of Classification Search
CPC .. G06Q 30/0236; G06Q 50/20; G06Q 40/025; G06Q 20/20; G09B 19/18; G09B 5/125
See application file for complete search history.

(56) References Cited

U.S. PATENT DOCUMENTS

| | | | | |
|---|---|---|---|---|
| 8,515,842 | B2 * | 8/2013 | Papadimitriou | G06Q 40/00 705/35 |
| 8,566,187 | B2 * | 10/2013 | Keld | G06Q 10/10 705/30 |
| 9,058,627 | B1 * | 6/2015 | Wasser | G06F 3/0482 |
| 2005/0027633 | A1 * | 2/2005 | Fortuna | G06Q 30/06 705/36 R |

(Continued)

*Primary Examiner* — Xuan M Thai
*Assistant Examiner* — Malina D. Blaise
(74) *Attorney, Agent, or Firm* — Armstrong Teasdale LLP

(57) ABSTRACT

A computer-implemented method of providing educational messages to a consumer includes issuing a line of credit to the consumer. The method may include presenting a credit education course to the consumer; activating the line of credit; and/or processing a transaction payable on the line of credit. The method further includes generating a credit message based upon transaction data for the transaction, and/or presenting the credit message to the consumer, such as via their mobile device. As a result, credit coaching or education may be provided to, for example, teach consumers how credit works, protect them from common mistakes, and/or build confidence in handling credit. The credit messages may include information related to transaction values, credit limits, percent utilization, billing dates, interest rates, and/or other banking information associated with the consumer. Upgraded financial and insurance products may be offered or provided to the consumer over time based upon good financial behavior.

14 Claims, 14 Drawing Sheets

(56) References Cited

U.S. PATENT DOCUMENTS

| | | | |
|---|---|---|---|
| 2006/0195376 A1* | 8/2006 | Jung | G06Q 40/00 705/35 |
| 2010/0023434 A1* | 1/2010 | Bond | G06Q 40/00 705/35 |
| 2010/0325048 A1* | 12/2010 | Carlson | G06Q 20/20 705/44 |
| 2014/0074689 A1* | 3/2014 | Lund | G06Q 40/025 705/38 |
| 2014/0156501 A1* | 6/2014 | Howe | G06Q 40/025 705/38 |
| 2016/0006872 A1* | 1/2016 | Hamlin | H04M 3/5175 379/265.06 |
| 2016/0350677 A1* | 12/2016 | Pathak | G06Q 50/20 |
| 2018/0041644 A1* | 2/2018 | Charles | G06Q 30/0207 |

* cited by examiner

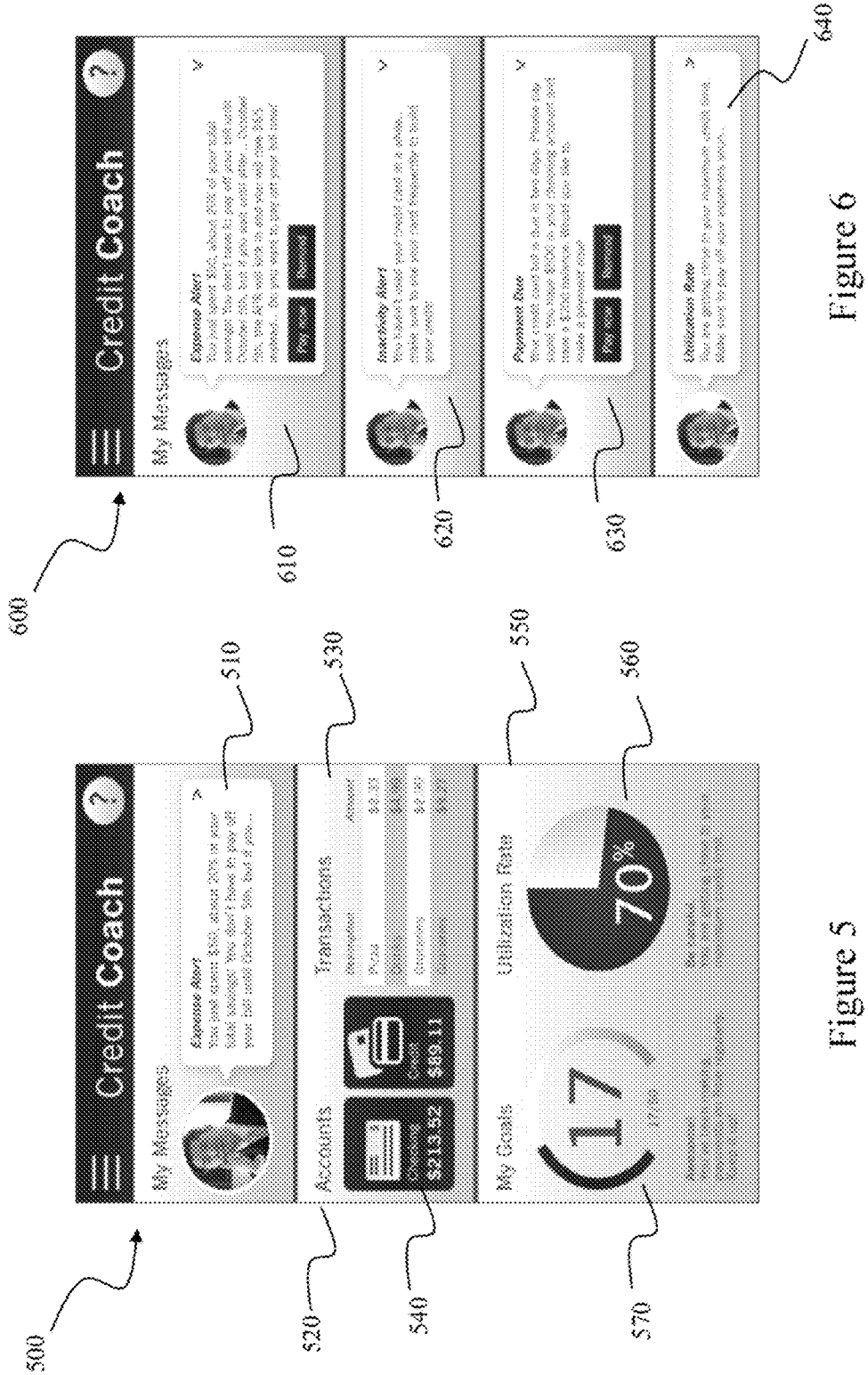

SYSTEMS AND METHODS FOR PROVIDING CREDIT COACHING

CROSS-REFERENCE TO RELATED APPLICATIONS

This application claims the benefit of priority of U.S. Provisional Patent Application Ser. No. 62/186,153, filed Jun. 29, 2015, and U.S. Provisional Patent Application Ser. No. 62/289,697, filed Feb. 1, 2016, the contents of both are hereby incorporated by reference, in their entirety and for all purposes, herein.

FIELD OF THE INVENTION

The present disclosure relates to consumer education on credit and, more particularly, to systems and methods for providing educational messages to a user in response to a received electronic signal.

BACKGROUND

Education is an important aspect of financial stability for consumers. Many consumers, for example, do not fully understand how credit works. This lack of understanding may lead consumers into mistakes that may hurt their credit scores and lower their confidence in managing their credit. This lack of understanding often occurs with younger and less-experienced consumers, as well as consumers with a poor credit history. Such consumers may struggle to gain access to the credit they want or need. Once a consumer is issued, or extended, credit, they may not understand what it is; how to build it; how to maintain it; and/or how to use it in a wise manner. When a consumer makes a mistake with their credit or has made poor credit decisions in the past, they may not understand the mistake, and/or may struggle to correct such decisions in the future. Consumers who have such experiences may feel like they lack control of their own financial future, and often lack the confidence to deal with sometimes confusing and emotional financial episodes. These experiences may ultimately hurt the consumer's credit and expose them to unnecessary financial risk.

Many institutions lend money or extend credit to their consumers. A given institution's lending or credit business generally represents an investment with some amount of risk and some amount of reward. These institutions typically enter the lending and credit market to generate profit, so they generally try to minimize risk in their lending and maximize reward. A given institution may manage risk by being selective of their consumers and limiting the amount of credit that is extended. A given institution may manage reward for a consumer who displays good credit traits by adjusting interest rates, which represent the price of credit to consumers.

An ideal consumer for an institution is typically one with a good credit history, one that pays their bills, and one that is interested in borrowing funds from the institution. The ideal consumer typically pays a lower interest rate relative to a non-ideal consumer. Such ideal consumers represent low risk and modest reward. Unfortunately, not everyone is financially perfect. Many consumers, such as young and inexperienced consumers, for example, may have little or poor credit history. Such consumers represent more risk. Institutions may still want to lend money or extend credit to these consumers, but are less sure of the reward. A higher risk consumer may be extended less credit at higher interest rates, but the institution doesn't necessarily know whether they will be paid the full reward, if anything at all. Consequently, it may be in many institutions' best interest to develop their consumers into educated and financially stable consumers.

BRIEF SUMMARY

The present embodiments may relate to systems and methods for providing educational messages to a consumer, including educational messages directed to credit management. Providing such messages is referred to as "credit education" or "credit coaching." Credit education aims to teach consumers how credit works, protect them from common mistakes, and/or build confidence in handling credit. Each time a transaction is processed on a line of credit, whether by the swipe of a payment card, or by virtual wallet, the transaction data is relayed in real-time to the educational server. The educational server may provide real-time or other feedback to the consumer in the form of credit messages. The credit messages may include, for example, and without limitation, information related to transaction values, credit limits, percent utilization, billing dates, interest rates, and/or other banking information for the consumer. Credit education may include a credit education course or, further, establishing financial goals for the line of credit based upon input from the consumer or from an issuing institution.

In one aspect, a computer-implemented method of providing educational messages to a consumer may be provided. The method may include, via one or more processors, (1) issuing a line of credit to the consumer; (2) presenting a credit education course to the consumer; (3) activating the line of credit; (4) processing a transaction payable on the line of credit; (5) generating a credit message based upon transaction data for the transaction; and/or (6) presenting the credit message to the consumer to facilitate providing credit coaching to the consumer. The method may include additional, less, or alternate actions, including those discussed elsewhere herein, and/or may be implemented via one or more local or remote processors (for instance, by mobile devices in wireless communication with remote servers), or via computer-executable instructions stored on non-transitory computer-readable media or medium.

In another aspect, a mobile computing device may be provided. The mobile computing device may include (1) a display; (2) a network interface controller (NIC); (3) non-transitory memory configured to store computer-executable instructions; and/or (4) a processor coupled to the display and the NIC, the processor configured to gain access to the non-transitory memory and execute the computer-executable instructions, causing the processor to (a) present a credit education course on the display; (b) transmit a course completion message, through the NIC, to an educational server to initiate an activation procedure for a line of credit; (c) receive transaction data from a credit issuing institution through the NIC, the transaction data representing a transaction payable on the line of credit; and/or (d) present a credit message on the display, the credit message based upon the transaction data to facilitate providing credit coaching to the consumer. The mobile device may include additional, less, or alternate functionality, including that discussed elsewhere herein.

In yet another aspect, a computer system for providing educational messages may be provided. The system may include (1) a payment device associated with a consumer to whom a line of credit is issued; (2) a point-of-sale (POS) system configured to communicably couple to the payment device to process a transaction payable on the line of credit;

and/or (3) an educational server communicably coupled to the POS system over a network and configured to: (a) initiate an activation procedure for the line of credit upon receipt of an indication the consumer has completed a credit education course; (b) receive transaction data for the transaction from the POS system; (c) generate a credit message based upon the transaction data; and/or (d) transmit the credit message toward the consumer to facilitate providing credit coaching to the consumer. The system may include additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 5 depicts an exemplary credit coach application that may be used in the system shown in FIG. 2;

FIG. 6 depicts another exemplary credit coach application that may be used in the system shown in FIG. 2;

Figure 1:
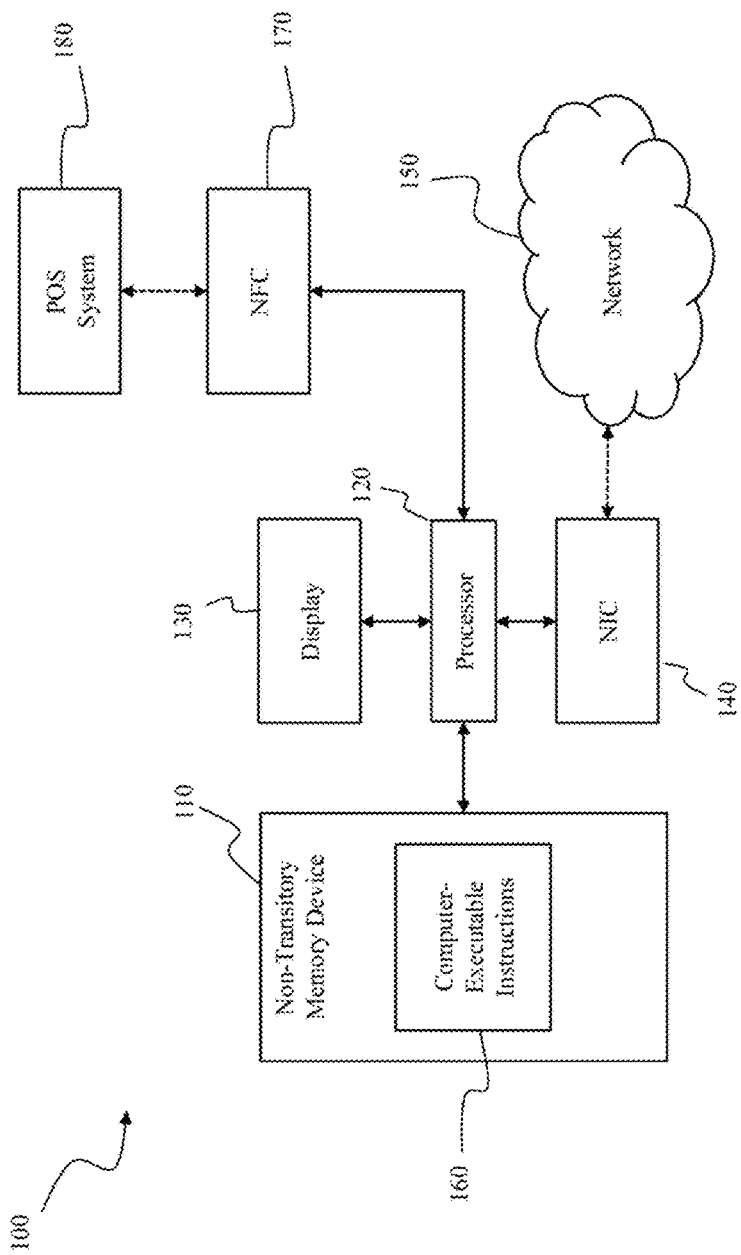
FIG. 1 depicts an exemplary mobile computing system for receiving and displaying educational messages therefore targeted to a consumer in to consumer activity.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for providing educational messages to a consumer in response to an electronic signal received by a computing device. In one embodiment, the electronic signal may be a message indicating a payment has been initiated by the consumer with a payment card. Providing such educational messages is referred to as "credit education" or "credit coaching." Credit education aims to teach consumers how credit works, protect them from common mistakes, and build confidence in handling credit. A credit coach may be implemented through an application running on a mobile computing device, such as a smart phone, tablet, personal digital assistant (PDA), smart watch, wearable electronics, laptop, or any other suitable mobile device configured for wireless communication and/or data transmission. A credit coach may also be implemented in combination with a payment card (e.g., a credit card, a debit card, or some other payment card). Alternatively, a credit coach may be implemented using a virtual payment device, such as a virtual wallet application on the mobile computing device.

For each transaction made on a line of credit, when the payment card is processed, transaction data may be generated at a point of sale (POS) system, and transmitted to the appropriate banking institutions to initiate a transfer of funds from the payor to the payee. For example, the POS system may send an authorization request to the credit issuing institution (e.g., the consumer's bank) for the line of credit to authorize payment to a merchant's bank. The POS system may also send a message to the merchant's bank to verify the merchant's information. The transaction data may also be transmitted to an educational server configured to provide educational messages and other information in response to receiving the transaction data signal.

The educational server may distribute the transaction data to the credit coach application running on the mobile computing device. The credit coach application may then provide real-time feedback to the consumer in the form of one or more credit messages. Additionally or alternatively, the educational server may generate the real-time (or near real-time) feedback and transmit one or more credit messages to the mobile computing device.

A credit message may include information important to the consumer and that educates the consumer on how credit works, for example, with respect to annual percentage rate (APR), finance charges, billing cycle, minimum payments, and/or debit versus credit. The credit message may help prevent the consumer from making common credit mistakes and/or may build confidence with handling credit. A credit message may include an amount of a particular transaction and, further, may compare that amount to a credit limit on the line of credit, and/or to a balance in another checking or savings account associated with the consumer. Such a comparison may help the consumer understand the impact of that particular transaction on their finances. A credit message may include a billing date on which payment for the transaction is due, a due date for a next bill, and/or an impact of the APR on the amount of the transaction if not paid on time.

The educational server may receive banking data for one or more accounts associated with the consumer, such as a checking or savings account. Banking data may include account balances or further transaction data. The educational server may then generate a credit message or may pass the banking data along to the credit coach application running on the mobile computing device. Alternatively, the credit coach application may receive the banking data directly from the banking institution for the one or more accounts.

The credit coach application may present one or more credit education courses to the consumer to help educate the consumer on how credit works. Such a credit education course may be presented before the line of credit is activated, such that even the first transaction payable on the line of credit comes with some amount of credit coaching. The credit coach application, running on the mobile computing device, may present the credit education course and, upon completion, send a course completion message to the educational server indicating the credit education course was indeed completed. The educational server may then send a message to initiate the activation procedure for the line of credit by presenting the consumer with an activation phone number or a web site, for example. Once activated, the line of credit may then be used for purchases.

The credit coach application may establish financial goals for the line of credit. The financial goals may be established based upon the consumer's input, credit needs, and desires. The financial goals may also be established based upon the credit issuing institution's inputs. For example, the credit coach application may establish a goal of 24 consecutive on-time payments, the achievement of which may increase the consumer's credit limit for the line of credit, and/or may reduce the APR on the line of credit. The credit coach application may present progress reports to the consumer, and/or may include their progress toward their goals in a credit message.

At least one of the technical problems addressed by this system may include: (i) a lack of access to credit; (ii) a lack of understanding of credit; (iii) a lack of tools to help consumers build credit; (iv) a lack of understanding of credit history and past credit decisions; (v) a lack of financial control; (vi) a lack of confidence; and/or (vii) poor credit scores.

A technical effect of the systems and processes described herein may be achieved by performing at least one of the following steps: (a) issuing a line of credit to a consumer; (b) presenting a credit education course to the consumer; (c) activating the line of credit; (d) processing a transaction payable on the line of credit; (e) generating a credit message based upon transaction data for the transaction; and (f) presenting the credit message to the consumer.

The technical effect achieved by this system may be at least one of: (i) improving access to credit; (ii) increasing understanding of credit; (iii) providing tools for building credit safely and wisely; (iv) increasing understanding of credit history and past credit decisions; (v) improving consumers' control of their financial future; (vi) improving consumers' confidence in their finances; and (vii) improving credit scores and reducing unnecessary financial risk.

Exemplary Computer System

FIG. 1 depicts an exemplary mobile computing system 100 for receiving and displaying educational messages targeted to a consumer. Mobile computing system 100 may include non-transitory memory device 110, a processor 120, a display 130, and/or a network interface controller (NIC) 140. NIC 140 may be configured to communicably couple mobile computing device 100 to a network 150. Non-transitory memory device 110 may be configured to store computer-executable instructions 160.

Processor 120 may be coupled to display 130 and NIC 140. Upon execution of computer-executable instructions 160, processor 120 may cause display 130 to display a credit coach application included in computer-executable instructions 160 on mobile computing device 100. Further, upon execution of computer-executable instructions 160, processor 120 may communicate with network 150 through NIC 140.

Mobile computing system 100 may also include a near-field communication (NFC) device 170 for communicably coupling to a POS system 180. Processor 120 may be further configured to carry out transactions with POS system 180 through NFC device 170.

Upon execution of computer-executable instructions 160, processor 120 may be configured to present the consumer with a credit education course on display 130. Upon completion of the credit education course, processor 120 may be configured to transmit a message, through NIC 140 to network 150, ultimately to be received by a credit issuing institution for the line of credit. The message initiates an activation procedure by which the line of credit is activated.

When a transaction is processed, transaction data for the transaction may be transmitted to mobile computing device 100 through NIC 140. In alternative embodiments, the transaction data may be transmitted to an educational server, which then may pass that transaction data along to mobile computing device 100, or may generate and transmit a credit message to mobile computing device 100. Processor 120, upon execution of computer-executable instructions 160, may be further configured to generate a credit message based upon the transaction data. The credit message may then be displayed on display 130.

In certain embodiments, mobile computing device 100 may be configured to receive banking data for an account associated with the consumer through NIC 140 and network 150. Processor 120, upon execution of computer-executable instructions 160, may be further configured to generate the credit message based upon the transaction data and the banking data. Mobile device 100 may include additional, less, or alternate functionality, including that discussed elsewhere herein.

Exemplary System

Figure 2:
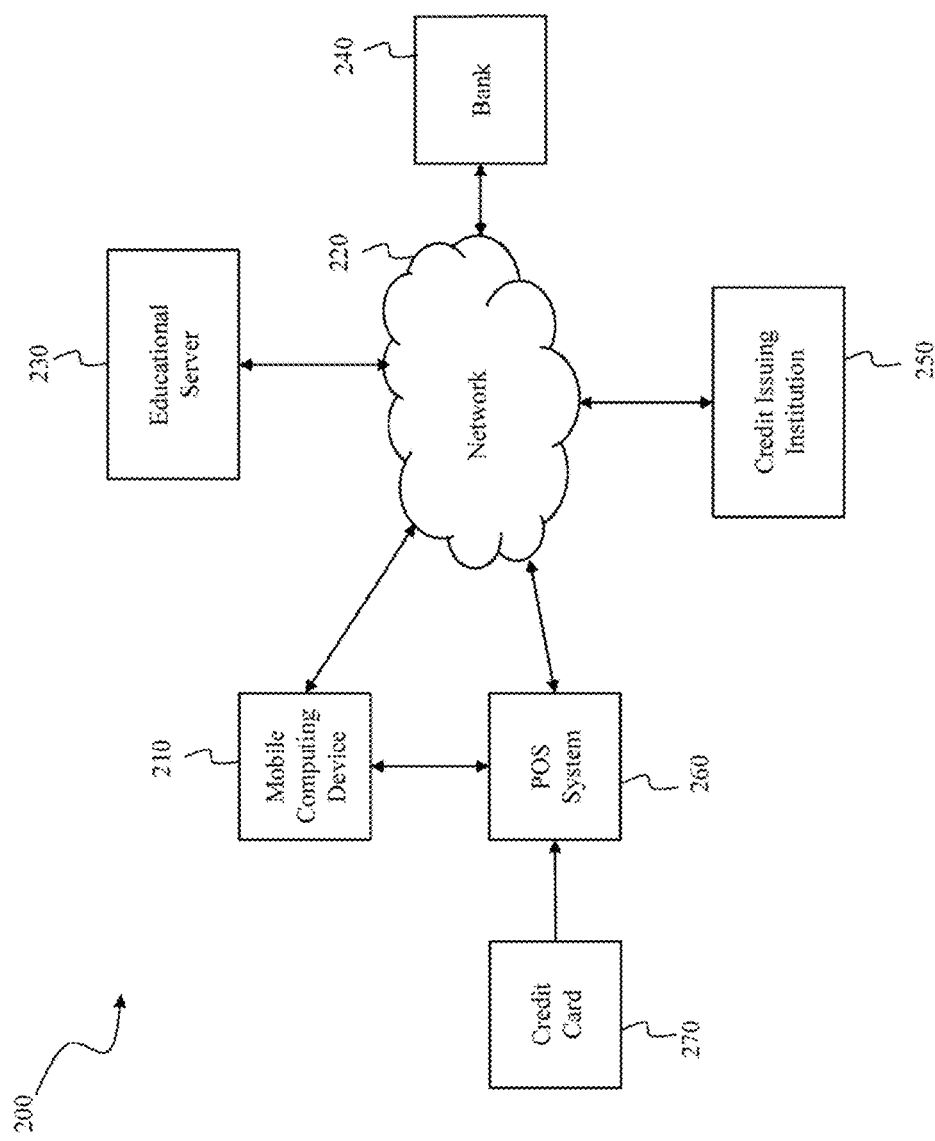
FIG. 2 depicts an exemplary computing system for creating and transmitting the educational messages shown in FIG. 1.

FIG. 2 depicts an exemplary computer system 200 for creating and transmitting the educational messages to a consumer. System 200 may include a mobile computing device 210, similar to mobile computing device 100 (shown in FIG. 1), and a network 220, similar to network 150 (also shown in FIG. 1). System 200 may further include an educational server 230, a bank 240, a credit issuing institution 250, a POS system 260, and/or a payment card 270.

Mobile computing device 210 may be configured to communicably couple to network 220, as is illustrated in FIG. 1 between mobile computing device 100 and network 150. Network 220 may further be configured to be communicably coupled to educational server 230, bank 240, credit issuing institution 250, and/or POS system 260. Mobile computing device 210 may be configured to run a credit coach application (not shown in FIG. 2).

Credit issuing institution 250 extends the consumer a line of credit that may be used for transactions. Transactions may be carried out with any payment device, such as, for example, mobile computing device 210 and payment card 270. A transaction may be carried out with POS system 260, which generates transaction data for the transaction. The transaction data may be transmitted to mobile computing device 210, to educational server 230, to bank 240, and/or to credit issuing institution 250, among other places.

When educational server 230 receives the transaction data, the transaction data may be relayed back to mobile computing device 210 through network 220. In an alternative embodiment, educational server 230 may generate a credit message based upon the transaction data and transmit the credit message to mobile computing device 210 through network 220.

Educational server 230 may be configured to receive banking data from bank 240, which provides banking information for one or more accounts associated with the consumer. Educational server 230 may then generate a credit message based upon the transaction data and the banking data. Alternatively, the credit coach application running on mobile computing device 210 may receive the transaction data and the banking data, and then may generate the credit message.

Educational server 230 may be configured to receive information regarding the line of credit from credit issuing institution 250. Line of credit information may include, for example, a balance amount, a credit limit, an APR, and/or a percent utilization.

Exemplary Computer-Implemented Methods

Figure 3:
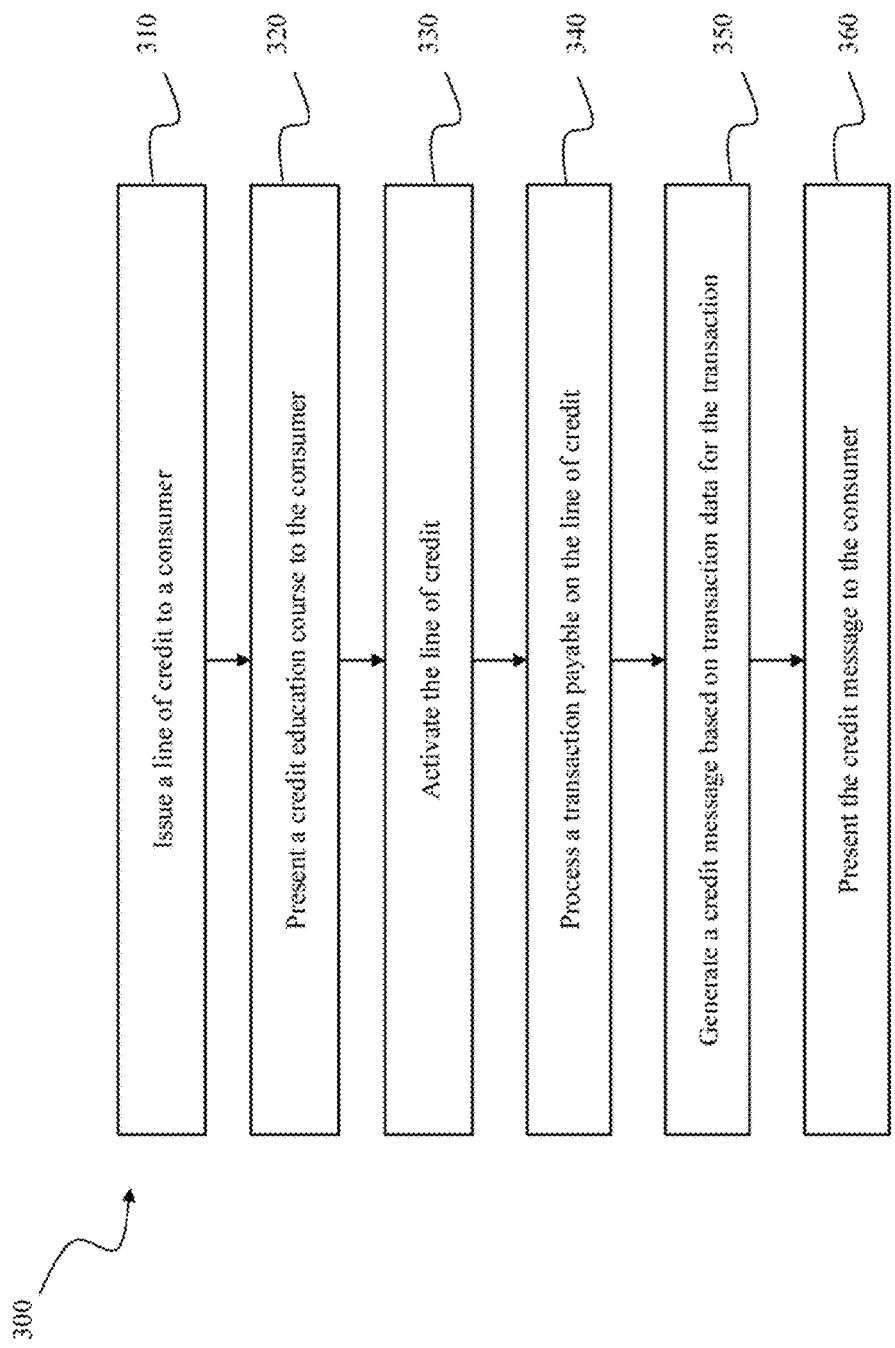
FIG. 3 depicts a flow diagram for an exemplary computer-implemented method of creating and transmitting educational messages to a consumer that may be implemented by the system shown in FIG. 2.

FIG. 3 depicts an exemplary computer-implemented method 300 of creating and transmitting educational messages to a consumer. The method may begin at an issuing step 310, at which a line of credit may be extended to the consumer. The line of credit may be issued by a credit issuing institution, such as a bank or retailer, based upon qualifications of the consumer, which may include credit history. For example, a consumer with little to no credit history may qualify for the line of credit in combination with the credit coach program.

At a presentation step 320, a credit education course may be presented to the consumer. The credit education course may help the consumer understand their line of credit and how to use it wisely. The credit education course may be presented to the consumer on a mobile computing device, such as mobile computing device 100 (shown in FIG. 1). Upon completion of the credit education course, the line of credit may be activated at an activation step 330. Activation may be initiated by an educational server upon receipt of a message indicating the credit education course is completed. The activation procedure may include providing an activation phone number or website to the consumer.

Once activated, the line of credit may be used to carry out a transaction. The transaction may be processed at a transaction step 340. The transaction may be carried out using a payment card and a POS system. In alternative embodiments, the transaction may be carried out using a virtual wallet application on a mobile computing device. In certain embodiments, the mobile computing device may include a NFC device for communicating with a POS system to carry out the transaction.

Transaction data for the transaction may then be used to generate a credit message at generating step 350. The credit message may be generated at the educational server based upon the transaction data. In alternative embodiments, the credit message may be generated at the mobile computing device based upon the transaction data and using the credit coach application.

In certain embodiments, the credit message may be generated based further on banking data for one or more accounts associated with the consumer. For example, the credit message may be generated based upon the transaction data and information regarding a checking or savings account. The banking data may be provided to the educational server and used in combination with the transaction data. In alternative embodiments, the banking data may be provided to the mobile computing device and the credit coach application and used in combination with the transaction data.

At a messaging step 360, the credit message may be presented to the consumer. The credit message may be displayed on the mobile computing device using the credit coach application. In alternative embodiments, the credit message may be displayed in an email or a text message.

Figure 4:
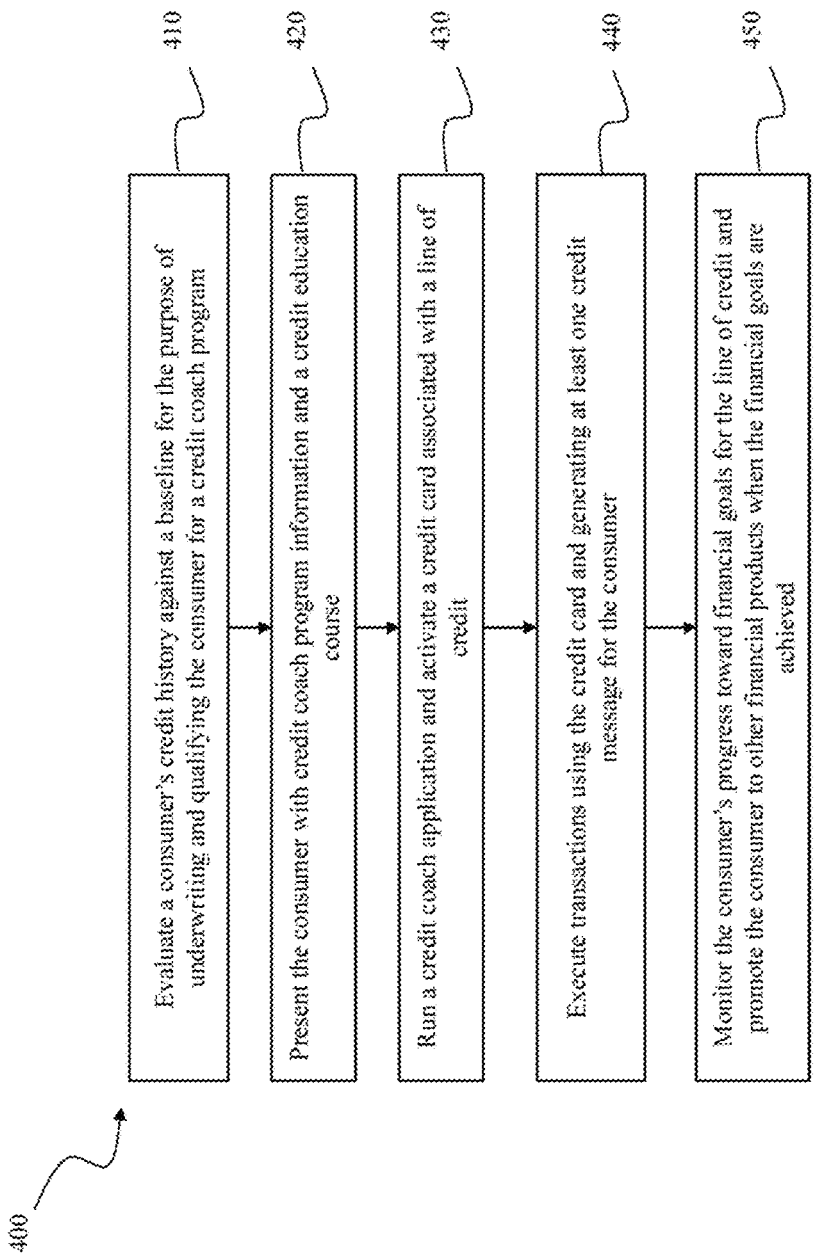
FIG. 4 depicts a flow diagram for another exemplary computer-implemented method of creating and transmitting educational messages to a consumer.

FIG. 4 depicts another exemplary computer-implemented method of creating and transmitting educational messages to a consumer. The method may begin at an evaluation step 410. At evaluation step 410, the consumer's credit history may be evaluated against a baseline, or model credit history. The consumer may be a prospective customer for a line of credit in combination with a credit coach program. The model credit history may be based upon credit risk data, actuarial data, known risk models, and/or credit histories of current credit and loan customers, among other data. If the consumer qualifies for the line of credit, the line of credit is underwritten.

At an education step 420, the consumer may be presented information regarding the credit coach, as well as a credit education course. The consumer may also install a credit coach application on a mobile computing device, which may then be used to present the credit education course. The credit education course may include multiple lessons and may require a passing grade on a quiz or other examination.

Upon completion of the credit education course, the application may initiate an activation procedure at activation step 430. Activation step 430 may include activating a payment card. Once activated, the line of credit may be used to carry out one or more transactions payable on the line of credit. A transaction is executed at a transaction step 440 using the payment card. During processing of the transaction, transaction data may be generated and used to generate one or more credit messages for the consumer. The credit messages provide real-time feedback to the consumer to help them progress toward their financial goals for the line of credit.

At a promoting step 450, the consumer's progress toward their financial goals may be monitored. When the consumer achieves a financial goal for the line of credit, the consumer may be promoted to another financial product within the credit coach program. Alternatively, the consumer may be promoted to another financial product outside the credit coach program. The computer-implemented methods 300, 400 may include additional, less, or alternate actions, including those discussed elsewhere herein, and/or may be implemented via one or more local or remote processors (for instance, by mobile devices in wireless communication with remote servers), or via computer-executable instructions stored on non-transitory computer-readable media or medium.

Exemplary Credit Messages

FIG. 5 depicts an exemplary credit coach application 500. Credit coach application 500 may include a textual credit message 510. Textual credit message 510 may include transaction data (i.e., a transaction amount) and a comparison of a transaction amount to banking data (i.e., a balance in a savings account). Textual credit message 510 may also include line of credit data (i.e., a billing due date).

Credit coach application 500 may also include another credit message 520 that includes transaction data 530 and banking data 540. Transaction data 530 may include a categorized list of purchases and the value of the transaction. Banking data 530 may include an account balance for a checking account.

Credit coach application 500 may also include a credit message 550 that includes line of credit information 560 and financial goals 570 for the line of credit. Credit information 560 may include a percent utilization of the line of credit. Financial goals 570 may include a measure of on time payments against a target number of consecutive on time payments.

FIG. 6 depicts another exemplary credit coach application 600. Credit coach application 600 may include a first credit message 610 that includes transaction data, banking data, and/or line of credit data. First credit message 610 may inform the consumer of a transaction amount relative to an amount in savings, and may further inform the consumer of the impact of paying off the transaction by the due date versus after. First credit message 610 may also prompt the consumer to pay off the transaction or save a reminder for later.

Credit coach application 600 may include a second credit message 620 that alerts the consumer of infrequent use of the credit line. Credit coach application 600 may also include a third credit message 630 that indicates a bill is due soon, provides account balance information for a checking account, and/or further prompts the consumer to pay the bill.

Credit coach application 600 may also include a fourth credit message 640 that includes credit utilization of the credit line and further reminds the consumer to pay off at least a portion of the line of credit to reduce the utilization. Credit coach applications 500, 600 may include additional, less, or alternate functionality, including that discussed elsewhere herein.

Exemplary Methods of Using Credit Coach Application

Figure 7:
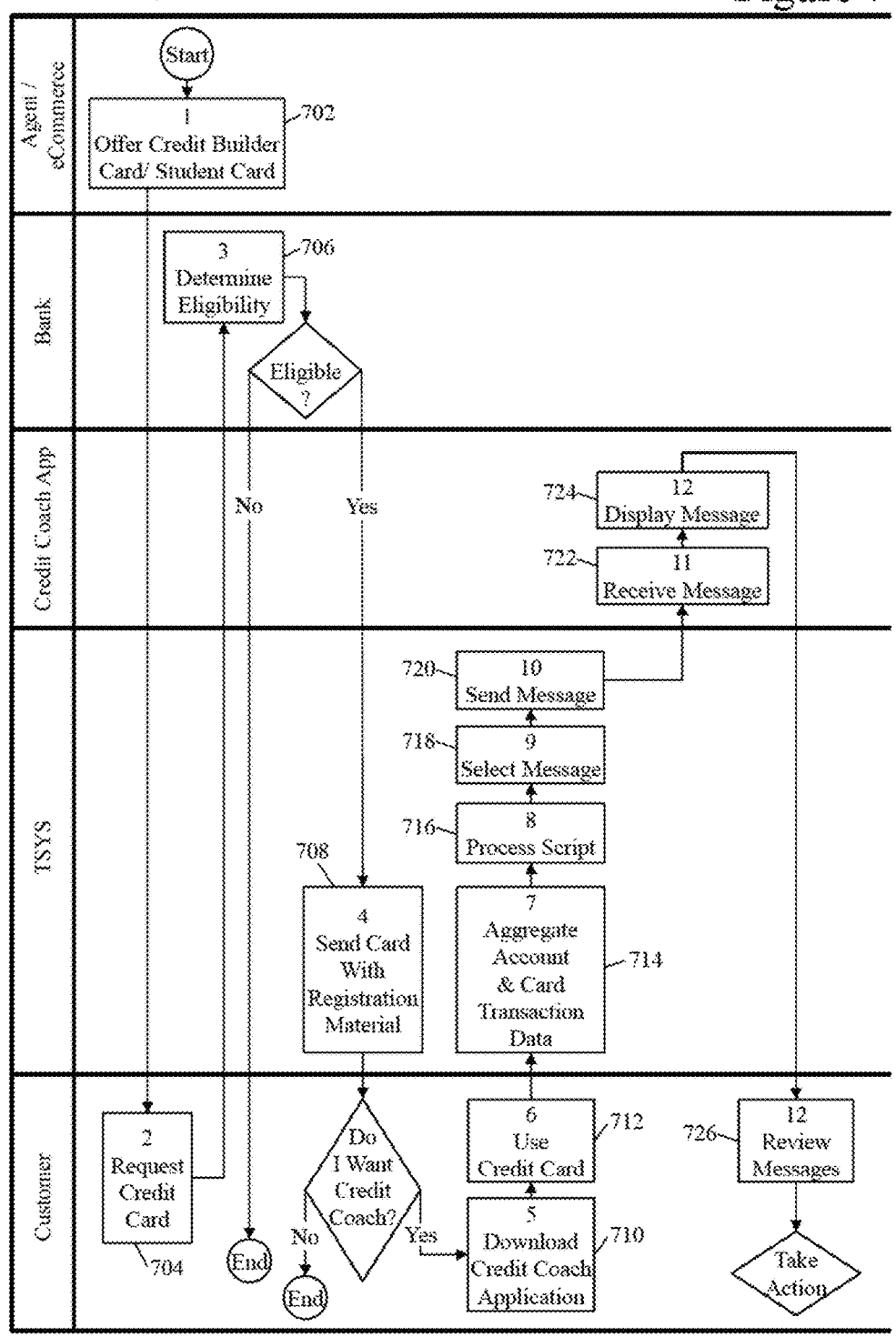
FIG. 7 depicts an exemplary method that may be implemented by the system shown in FIG. 2 to provide messages associated with a credit card to a consumer.
Figure 8:
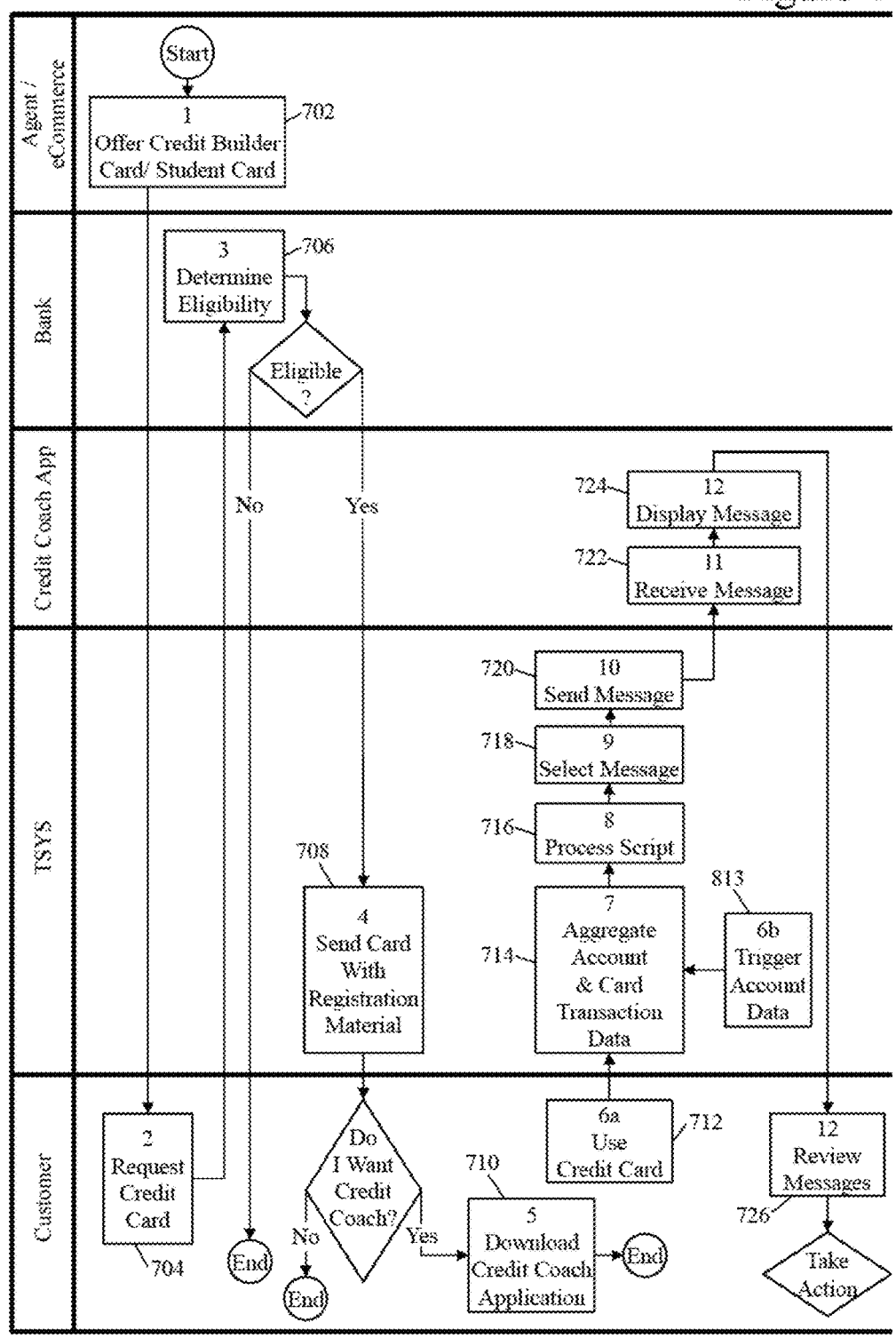
FIG. 8 depicts another exemplary method that may be implemented by the system shown in FIG. 2 to provide messages associated with a credit card to a consumer.

FIGS. 7 and 8 depict exemplary methods 700, 800 for using a computing system (e.g., system 200, shown in FIG. 2) to provide educational messages to a consumer associated with a credit card. The computing system may include an educational server in communication with a user computing device having a credit coach installed thereon. In the illustrated embodiment, method 800 may be similar to method 700 and, in the absence of contrary representation, uses the same reference numbers. Methods 700, 800 may include additional, fewer, or alternative steps, including those described elsewhere herein.

Methods 700, 800 may begin with an agent or eCommerce website associated with a credit card provider offering 702 a credit card to a candidate cardholder or customer. In the exemplary embodiment, the candidate cardholder may be offered a "credit builder" or student credit card. The candidate cardholder may request 704 to receive the credit card. An issuing bank may determine 706 if the candidate cardholder is eligible for the credit card. The issuing bank may determine 706 the candidate cardholder's eligibility based upon, for example, the candidate cardholder's credit score, occupation, and other credit information. If the candidate cardholder is not eligible, the bank may decline the candidate cardholder's request for the credit card. If the candidate cardholder is eligible, the bank may send 708 the card to the candidate cardholder.

The educational server ("TSYS") or another educational service provider may include registration material for the credit coach application with the credit card. The candidate cardholder may receive the credit card and the registration material and may decide whether or not to use the credit coach application. If the candidate cardholder decides to use the credit coach application, the cardholder may download 710 the credit coach application on a computing device associated with the cardholder (e.g., mobile computing system 100, shown in FIG. 1). In the exemplary embodiment, the cardholder may register an account with the educational server. When the cardholder uses 712 the credit card to complete transactions, the educational server may aggregate 714 account and credit card transaction data associated with the cardholder. With respect to FIG. 8, the educational server may trigger 813 account data associated with the cardholder in response to the cardholder using 712 the credit card.

The educational server may process 716 a script to identify an educational message that may be relevant to the cardholder. The script may be configured to analyze the aggregated account and credit card transaction data to identify an educational message that may be relevant to the cardholder. The educational server may select 718 an educational message for the cardholder based upon the script. The educational server may send 720 the educational message to the cardholder's computing device. In particular, the educational server may send 720 the educational message to the credit coach application associated with the cardholder. The credit coach application may receive 722 the educational message and/or display 724 the message to the cardholder. The cardholder may then review 726 the educational message and take action based upon the educational message.

Exemplary User Interfaces of Credit Coach Application

FIGS. 9-16 depict exemplary user interfaces that may be displayed within a credit coach application (e.g., credit coach applications 500, 600 shown in FIGS. 5 and 6, respectively). It is to be understood that FIGS. 9-16 are for exemplary purposes only and that the credit coach application may include additional, fewer, or alternative user interfaces to present the user or cardholder the features and functionality described elsewhere herein.

Figure 9:
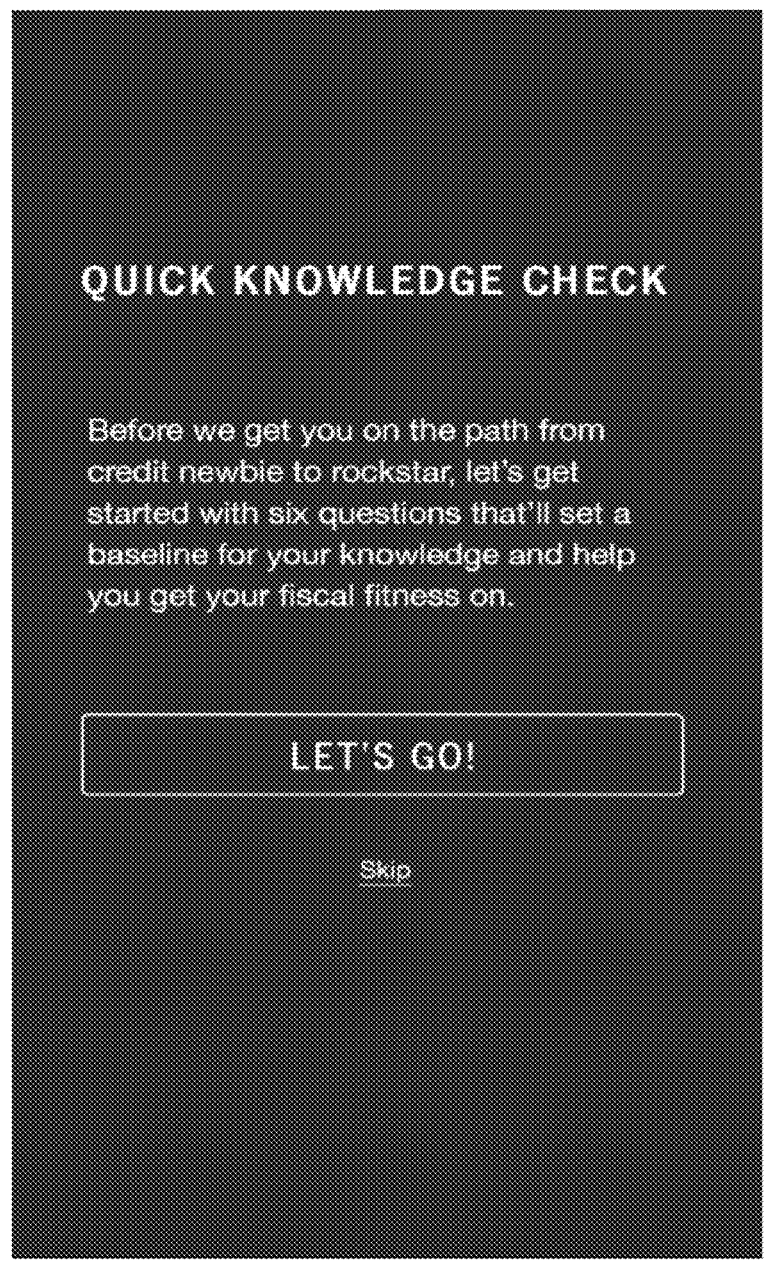
FIG. 9 depicts an exemplary user interface of a knowledge test that may be presented by the credit coach applications shown in FIGS. 5 and 6.
Figures 10, 11:
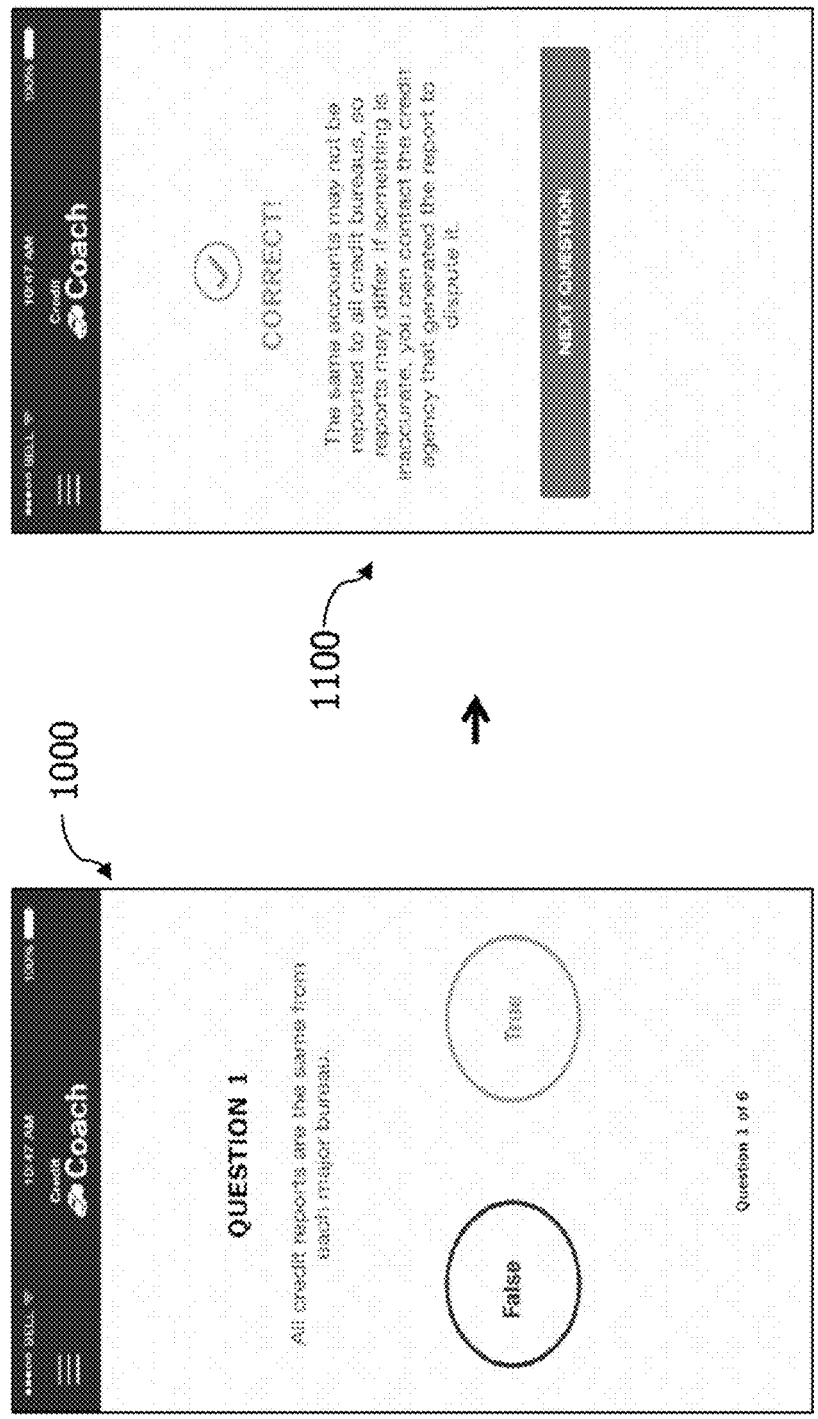
FIG. 10 depicts another exemplary user interface of a knowledge test that may be presented by the credit coach applications shown in FIGS. 5 and 6.
FIG. 11 depicts yet another exemplary user interface of a knowledge test that may be presented by the credit coach applications shown in FIGS. 5 and 6.

With respect to FIGS. 9-11, user interfaces 900, 1000, 1100 may illustrate an exemplary knowledge test for providing a user with basic or preliminary knowledge of financial topics related to credit. In the exemplary embodiment, the knowledge test may be a plurality of questions. User interface 1000 may illustrate an exemplary question and user interface 1100 may provide information about the answer to the question.

Figure 12:
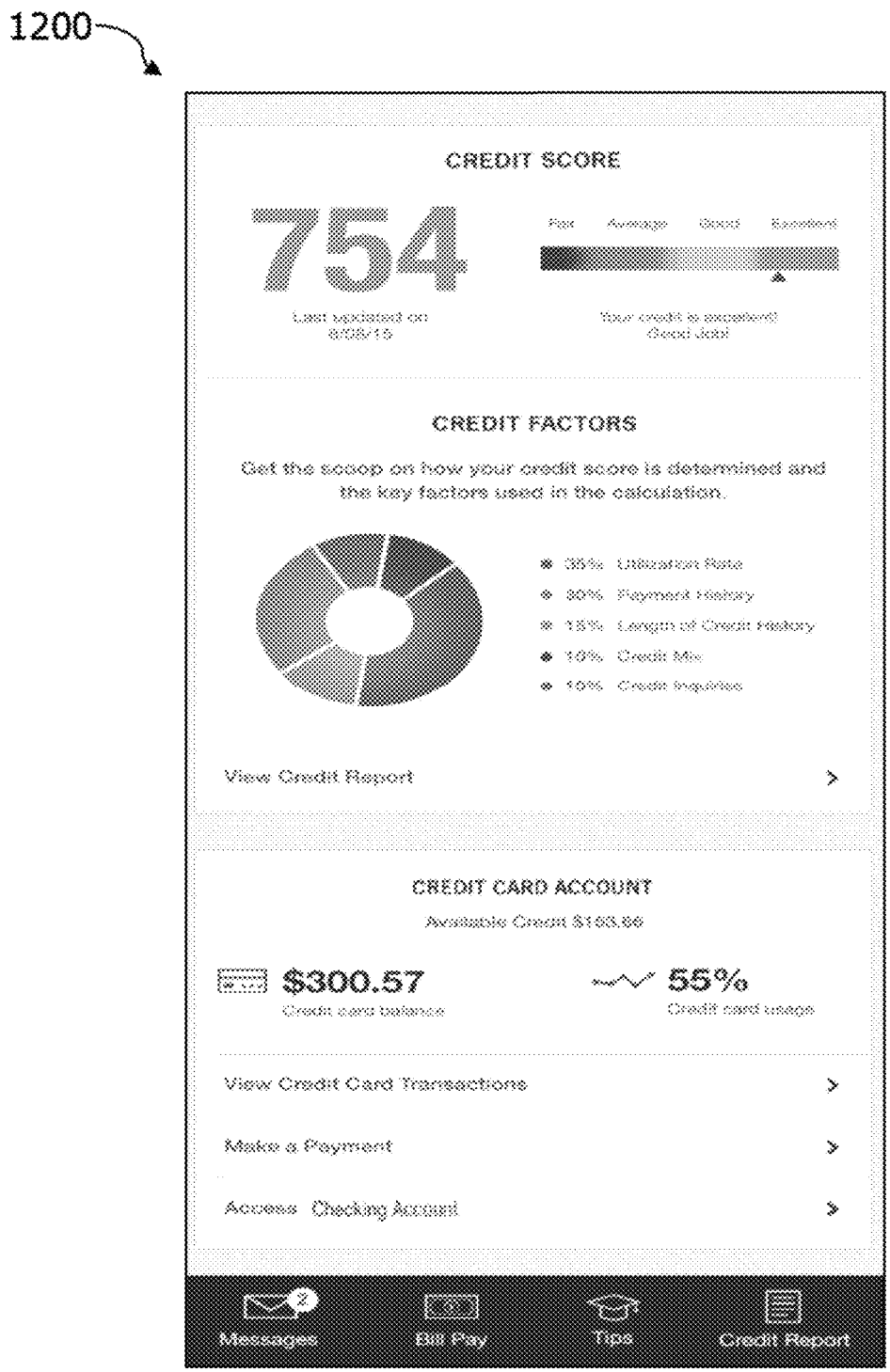
FIG. 12 depicts an exemplary user interface of a main page that may be presented by the credit coach applications shown in FIGS. 5 and 6.

With respect to FIG. 12, a user interface 1200 may illustrate a main or landing page that is shown by default to the user when the credit coach application is opened. User interface 1200 may include, for example, the user's credit score, the user's credit report, and/or the user's financial accounts and products (e.g., loans, credit cards, and checking accounts). User interface 1200 may also include a breakdown of five factors that influence the user's credit score. The five factors include credit utilization, payment history, length of credit history, credit account mix, and credit inquiries.

Figure 13:
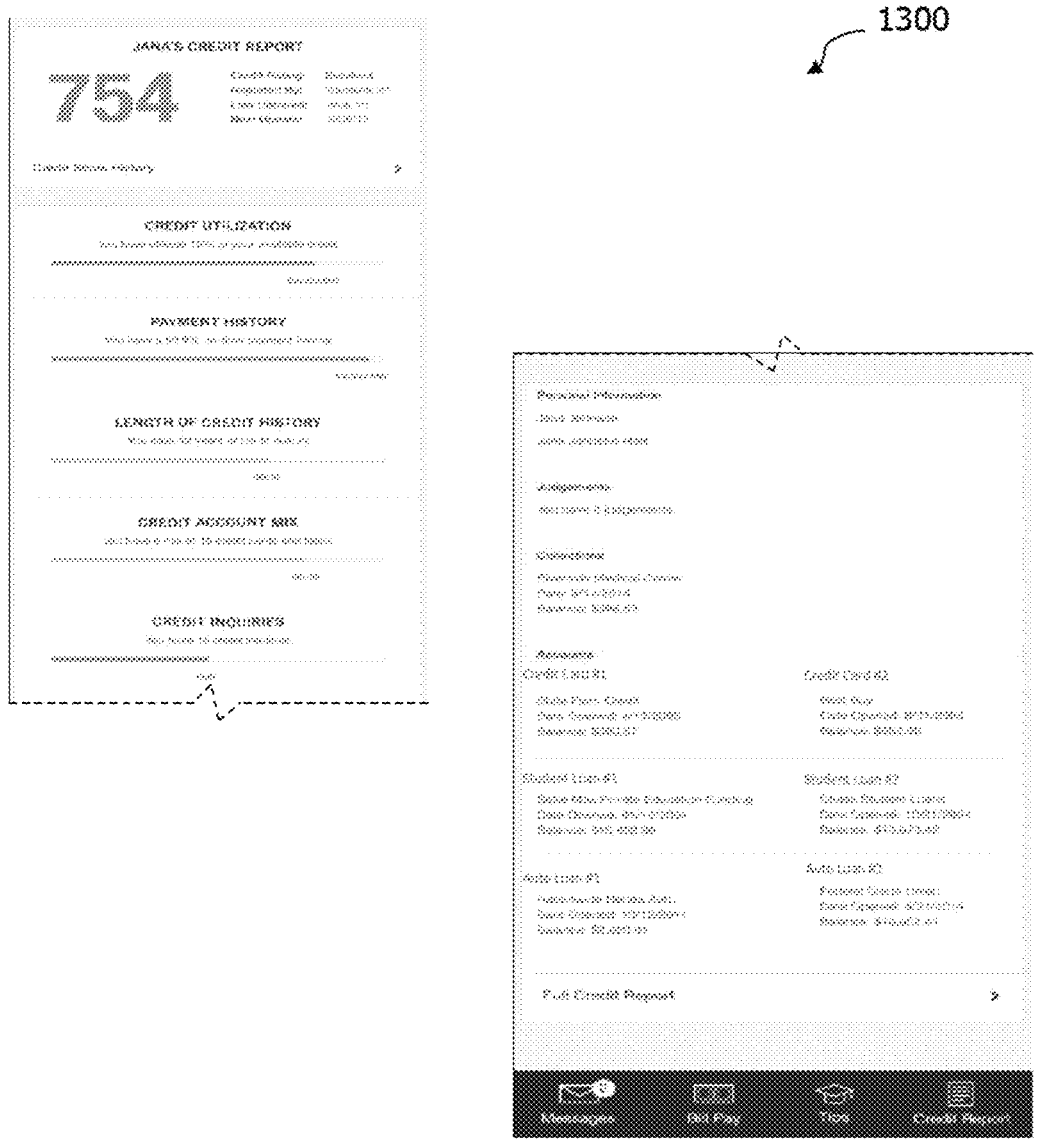
FIG. 13 depicts an exemplary user interface providing a user's credit report that may be presented by the credit coach applications shown in FIGS. 5 and 6.

FIG. 13 depicts a user interface 1300 that may be configured to provide the user with additional details on the user's credit report. User interface 1300 also provides the user's credit score and a breakdown of the five factors similar to user interface 1200. User interface 1300 also provides information on the accounts or lines of credit that influence the user's credit score.

Figure 14:
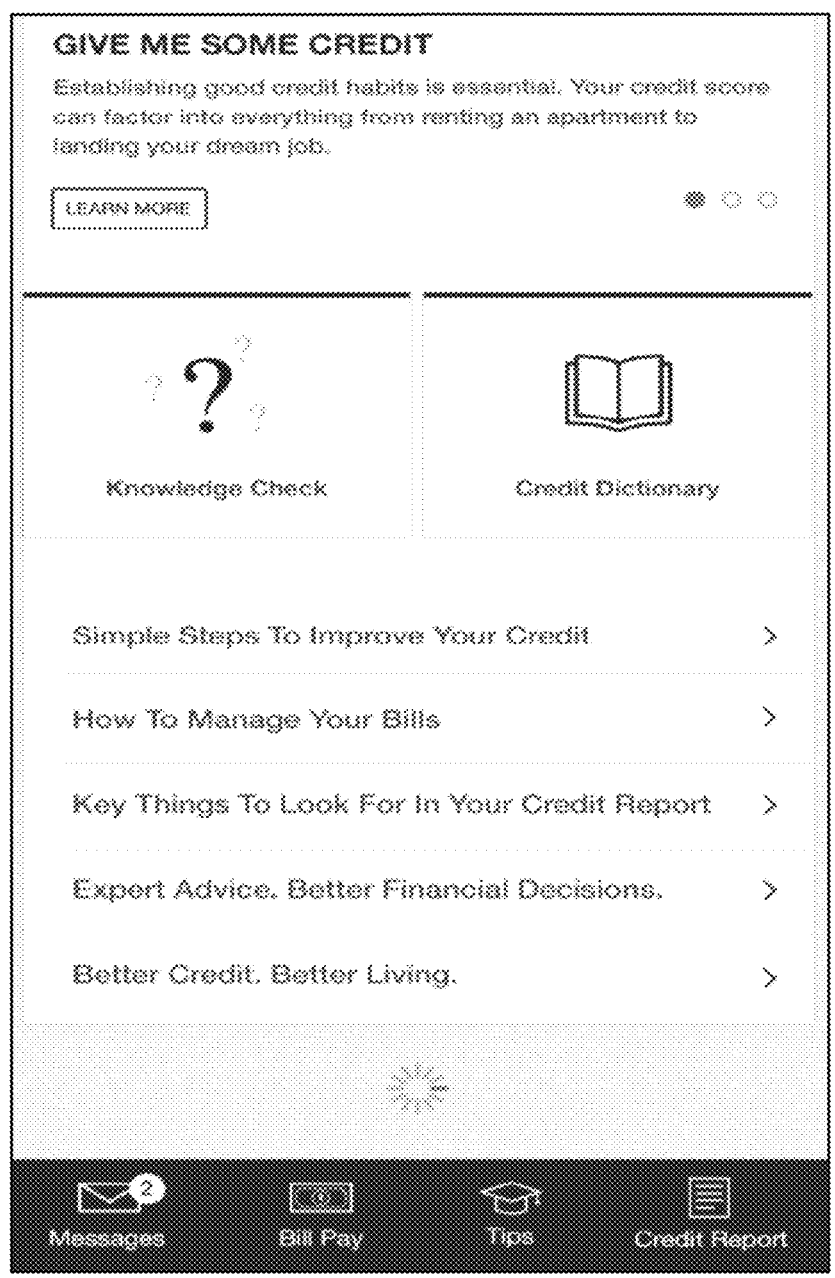
FIG. 14 depicts an exemplary user interface providing educational information that may be presented by the credit coach applications shown in FIGS. 5 and 6.

FIG. 14 depicts a user interface 1400 that may be configured to provide educational information related to credit to the user. For example, user interface 1400 may include educational videos and articles that the user may select. In the exemplary embodiment, user interface 1400 may include a glossary or dictionary of terminology associated with credit. In certain embodiments, user interface 1400 may include an option for a knowledge test, such as the knowledge test shown in FIGS. 9-11.

Figure 15:
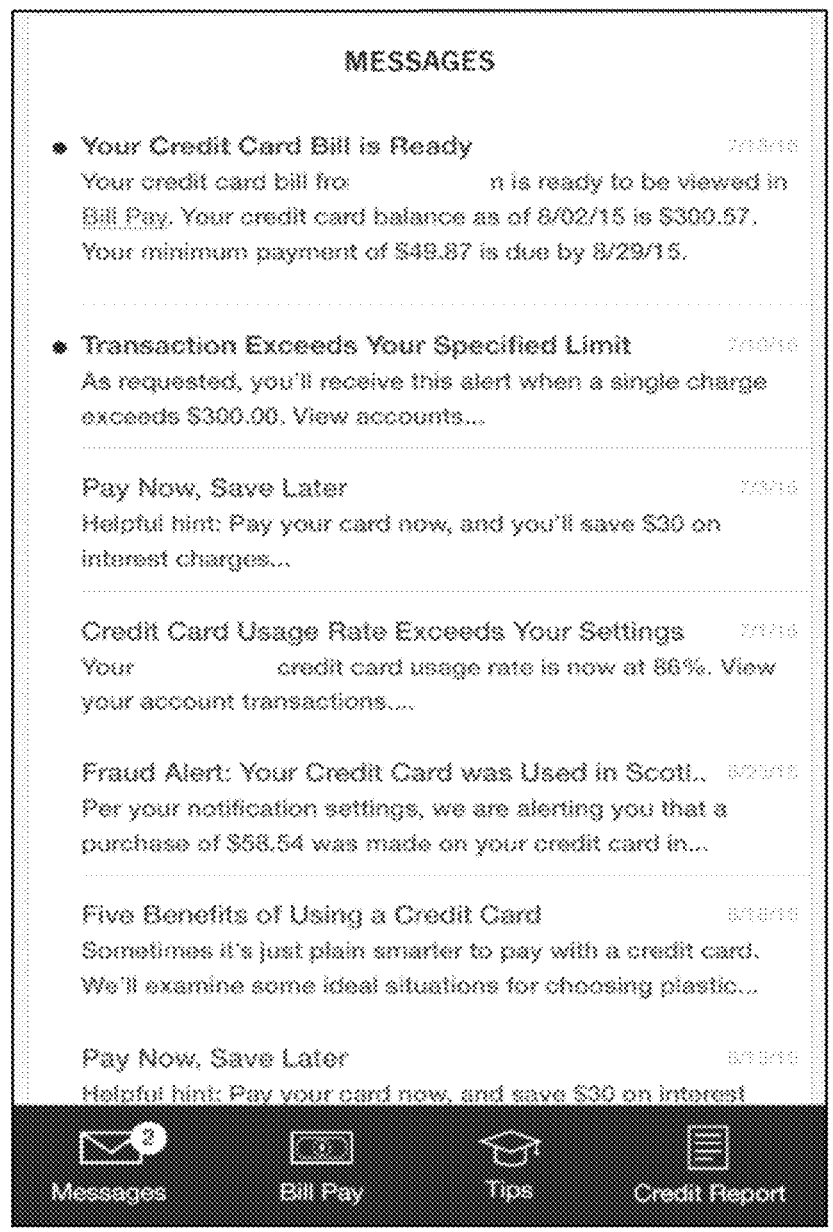
FIG. 15 depicts an exemplary user interface providing a message that may be presented by the credit coach applications shown in FIGS. 5 and 6.

With reference now to FIG. 15, a user interface 1500 may display one or more message from the credit coach application. The messages may include notifications regarding the user's financial accounts, educational information, and/or credit recommendations. The messages may be selected by the user to provide additional details.

Figure 16:
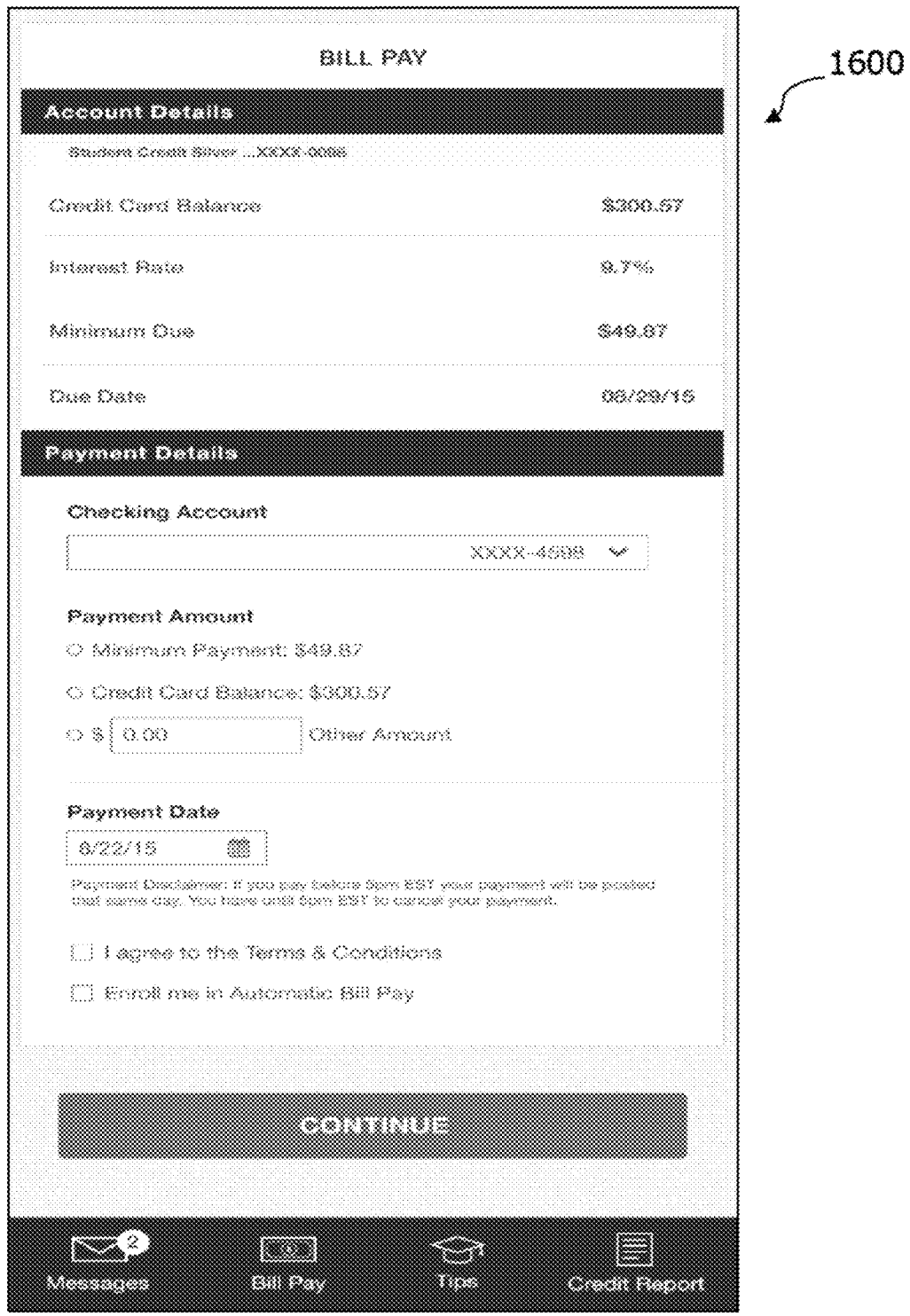
FIG. 16 depicts an exemplary user interface paying bills that may be presented by the credit coach applications shown in FIGS. 5 and 6.

FIG. 16 depicts a user interface 1600 that may be configured for paying bills. User interface 1600 may provide information regarding an amount due on a financial account, an interest rate of or associated with the account, a due date of the amount due, and/or payment information. In some embodiments, the credit coach application may include an option to enable automatic payments on the account.

Exemplary Credit Coaching

The "Credit Coach" (e.g., system 200, shown in FIG. 2) may be a system involving an interconnected functionality between a mobile App and a credit or debit card. The Credit Coach may include functionality designed to teach consumers how credit works (APR, finance charges, billing cycle, minimum payments, and debit vs. credit), protect consumers from common credit mistakes, and build confidence when handling credit. With each swipe of the card, the Credit Coach app may send real-time, or approximately real-time, feedback with important information to the cardholder, such as: the amount of the transaction in relation to the amount in the cardholder's checking account; the billing date this transaction falls into; the due date for the next bill; how the APR will affect the transaction if not paid on time, etc. In some embodiments, the Credit Coach may be configured to send information to the cardholder associated with other financial services or products may affect credit. For example, the Credit Coach may send messages to the cardholder regarding loans or mortgages associated with the cardholder. The Credit Coach may present a goal that the consumer will be working towards by demonstrating good credit habits. Once the consumer has reached the goal, the consumer may then be transitioned to the next product in their credit life cycle.

Key features of the Credit Coach may include: (i) educational credit course; (ii) a FAQ page; (iii) a virtual avatar; and (iv) credit messages. As an example, a mobile device application (e.g., credit coach applications 500, 600 shown in FIGS. 5 and 6, respectively) of the present embodiments may present the following information to a customer: "Example: Hey, Luke! You just charged $50—which is about 20% of your money! You don't have to pay off the expense until October 5th—BUT, if you wait until after October $5^{th}$ the APR will kick in and that will cost you $65! Do you want to pay off the expense now? Up to you!—Your Credit Coach." The mobile device may then present various options to Luke: "Pay your bill;" "Remind me later;" "Ignore;" and/or "Present progress report." The mobile device application may also provide checking/credit balances and/or transaction breakdowns. Additional features may include account information for credit cards, checking accounts, savings accounts, mortgages, and/or loans (e.g., vehicle loans). In certain embodiments, the mobile device application may include an option to communicate with a representative of the service provider associated with the mobile device application, such as an insurance or financial service provider.

The mobile device application may include or provide (1) an educational aspect through a "credit course;" (2) real-time feedback based upon the user's credit card activity; (3) credit score and usability ratings to the user; (4) users with a goal based on their credit activity; (5) options to pay a bill within the application, ignore the bill, and a "remind me later" option; and/or (6) rewards for positive credit behavior, such as the graduation to a bigger, better card (higher limits/lower interest rates).

The present embodiments may provide a solution that addresses the customer needs, include helping customers (a) access the credit that they desire; (b) understand credit, what it is, how to build it, how to maintain it, and how to use it wisely; (c) build credit safely and wisely; (d) understand bad past credit decisions and how to fix them; (e) feel in control of their financial future and confident in their ability to realize financial dreams; (f) feel confident and valued through this confusion and possibly emotional experience; and/or (g) build credit scores for future benefits without taking unnecessary risks.

The present embodiment may provide a credit building strategy to customers. A graduated financial card (e.g., credit or debit card) or virtual financial account may, at designated periods, incorporate a review of the customer's financial transactions to determine eligibility for credit line increases and product (such as financial or insurance products or services) upgrades for the customer. Creating increased product benefits may help better retain current customers and attract new ones for financial services or insurance providers. For instance, upgrades for a customer based upon credit card interest rates, home or vehicle interest rates, or lower premiums or higher discounts on auto, homeowners, renters, life, health, personal articles, or other types of insurance.

The Credit Coach system and/or a Credit Coach Card may meet product needs for new to credit customers over their life cycle. The Credit Coach embodiments may allow financial services or insurance providers service customers early in their credit life cycle with the desire of retaining that relationship. Eventually, other bank products, such as first home buyer mortgages and vehicle loans may be incorporated into this service.

The present embodiments also provide value to customers. Customers with little to no credit are often dissatisfied with their ability and lack of options to build their credit and access credit products. This present embodiments provide a simple and trustworthy process to build credit and confidence in using credit.

In one aspect, the Credit Coach system and/or a Credit Coach Card may be an all-in-one product and service provided by a bank. Customers may have the ability to build their credit while learning the ins and outs of how credit works and how it can affect them. The present embodiments may provide an interactive way for customers to receive helpful information regarding paying their bills, interest rates, working towards their goals and more. Customers unable to qualify for a credit card in the past may be able to start off with this lower limit credit card and credit coach application. This may provide those customers with an opportunity to prove their good credit habits and eventually transition to higher lines of credit and other bank, financial, or insurance products.

The present embodiments may address several customer needs. For instance, for a young person or a recent immigrant with no credit history, the Credit Coach system and embodiments may (a) help them understand how to build credit quickly and early; (b) help them understand what pitfalls to avoid; (c) provide them with way(s) to build credit (e.g., a credit builder card or a small starter loan that is reported to the credit bureaus); (d) provide them with the credit needed in a dignified way; (e) provide them with ways to prove credit-worthiness for things that require credit history that they don't have (loans, credit cards, etc); and/or (f) build financial knowledge and confidence.

Additionally, for a person who had their credit ruined by factors outside of their control, such a loss of job, housing market crash, divorce, catastrophe, or medical problems, the present embodiments may (i) help them understand how to rebuild their credit as quickly as possible; (ii) help them remove any derogatories from their credit report, if possible; (iii) provide them with ways to prove credit-worthiness when their score might not reflect true ability to pay; and/or (iv) help them feel in control and proud of their progress back to a good credit score.

Some embodiments may help customers who have good money habits but aren't sure how to build and improve their credit score. It may also help service provider representatives feel more comfortable asking customers about banking products, knowing that if they're declined, there is another option for them to work their way up to approval.

In one aspect, a successful credit building program of the present embodiments may be tiered, with applicants qualifying for a tier and working their way to the top. Each tier may consist of both credit information/counseling courses, as well as a small form of credit. The successful completion of a tier would graduate a participant up to the next one until he or she graduated from the program entirely. The successful credit building strategy may include a holistic lifecycle strategy, ensuring that customers in this program would be graduated into other financial services or insurance products that have long lifecycles and high retention rates. In one embodiment, the product may focus on the middle of the spectrum of credit scores (just barely too low to qualify for many credit products, as opposed to those lower on the spectrum).

In one aspect, the Credit Coach system may include a mobile device application installed on a customer's mobile device (e.g., smart phone) and a smart financial credit. The mobile device app may be configured to access the internet, a website, and/or a remote server via RF (Radio Frequency) wireless communication and/or data transmission. The website and/or remote server may be associated with a financial services or insurance provider, and may allow the financial services or insurance provider to communicate with the customer in real-time or near real-time, such as via text messages, and/or messages displayed on a secure website (after the customer logins and authenticates their account).

The customer may be provided with a smart financial card, such as a smart credit or debit card. The smart financial card may be configured with a processor, a memory, an application stored in the memory, a transceiver, a Near Field Communication (NFC) "chip," or another chip or processor/transceiver pair configured for wireless communication.

As a result, the mobile device app and the smart financial card may be able to communication with one another, such as via wireless communication or data transmission. The smart financial card may be able send a message to the mobile device app each time the customer conducts a financial transaction. The message may include what item was purchased, from whom, for what amount, when the transaction occurred, from what account the customer wants the monies spent taken from (e.g., credit or debit account), and/or other transaction information, such as financing terms or related agreements, such as warranties, or repair or maintenance programs.

The mobile device app may then communication the financial transaction information received from the smart financial card to a website or remote server, such as those associated with the financial services or insurance provider. The remote server may calculate an updated overall financial health for the customer based upon the recent financial transaction information, and generate associated financial messages or recommendations for the customer. The remote server may post the financial messages or recommendations to a secure website requiring log-in authentication, or transmit the financial messages or recommendations to the customer's mobile device for their review. The Credit Coach system may include additional, less, or alternate functionality, including that discussed elsewhere herein.

Exemplary Credit Coaching Technique

In one aspect, a computer-implemented method of credit coaching may be provided. The method may include (1) credit history evaluation and baseline; (2) providing the customer with the credit card, application and expectations to complete the process; (3) a credit course within the application that may have to be taken in order for the application to be unlocked and the credit card activated; (4) a user may begin and continue to use their credit card while being providing with credit coaching; and/or (5) once the user has reached the goals that have been set in place, they may be upgraded to other products, such as other financial services or insurance products. The method may include additional, less, or alternate actions, including those discussed elsewhere herein, and/or may be implemented via one or more local or remote processors, and/or via computer-executable instructions stored on a non-transitory computer-readable medium or media.

The method may include one or more processors performing a credit history evaluation and a developing a credit history baseline. Based upon this model, a prospective customer (most likely a customer who was just declined for a credit product and who was deemed a good match for this product) may first be underwritten. The model for underwriting may be created by experts in credit risk, actuaries, and underwriters based upon known risk models, the credit risk history of our current credit and loan customers, and/or likely other information. Based upon this underwriting process, a customer would be deemed a good risk for the program or not. A good risk may be someone who is not eligible for one or more of our other forms of credit, but who qualifies for the Credit Coach program based upon other positive criteria.

The method may include providing the customer with the credit card, application, and/or expectations to complete the process. Once the user has qualified to be a part of the Credit Coach program, they may be debriefed on the process and what it entails. The user may have to opt-in or otherwise agree to take the credit course and continue their credit education. It may be financial services or insurance provider's responsibility to engage the customer from the beginning on what the customer will receive from being a part of this service. It is important that future products and services that may become available to the customer be explained and sought after by the customer. Having a goal in place upon initiation of this program will aid in their success and retention of financial or insurance products.

The method may include a credit course within a mobile device or other computing device application having to be taken in order for the application to be unlocked and the credit (or other financial) card (or virtual card or account) being activated. The application may launch a credit course upon the customer's first login. The credit course may take on multiple different faces. Application specific information, as well as general education about credit, may be included. The credit course may include separate modules and require a passing grade of quizzes/tests. There may also be an option within the menu of the application to go back and reference any of the course material or retake the course.

The method may include allowing the user to begin and continue to use their credit card (or other financial card or virtual financial account) while being providing with credit coaching from the financial services or insurance providers. For instance, while swiping their credit card, the user may be receiving real-time feedback from their credit coach. Feedback may include messages about how much they spent in relation to how much money they have, their credit limits, interest rates, when their bill is due, how late payments will affect them, and/or other factors. Information about utilization, progress towards their goal and transactions may be available as well. Having a checking or banking (or other financial or credit card) account tied into the application may allow the user to pay their bill with a tap of a finger, such as via a mobile device application.

The method may include, once the user has reached the goals that have been set in place, upgrading the user to other products, such as other financial or insurance products. Over time, the user may have built enough credit and provided enough indication of positive credit behavior that they will now qualify for other financial services (e.g., credit card or loan offers), or insurance product increased discounts or lower premiums. The goal meter within the application may allow the customer to view their progress and work towards the goal of being upgraded to bigger and better products. Once they have met their goal, the services provider may usher them into the next step in their credit life cycle.

Exemplary Computer-Implemented Credit Coaching Methods

In one aspect, a computer-implemented method of providing credit coaching may be provided. The method may include (1) detecting or determining, via one or more processors (such as one or more processors associated with a mobile device), that a credit card or other financial transaction has occurred for a credit card or virtual financial account associated with a customer; (2) generating, via the one or more processors, credit coaching feedback based upon the credit card or other financial transaction (such as based upon an amount of a purchase, or an amount of money left in financial account); and/or (3) presenting, via the one or more processors, the credit coaching feedback on a display of the mobile device to facilitate providing credit coaching to the customer and/or for the customer to develop good financial habits.

The method may include (i) generating, accessing, or retrieving, via the one or more processors, a virtual credit course based upon the customer's financial (and/or credit card) activity; and/or (ii) presenting, via the one or more processors, the virtual credit course on a display of the mobile device for the customer's review. The method may include (iii) generating, via the one or more processors, a credit score and/or usability ratings based upon the customer's financial (and/or credit card) activity; and/or (iv) presenting, via the one or more processors, the credit score and/or usability ratings on a display of the mobile device for the customer's review. Additionally or alternatively, the method may include (v) generating, via the one or more processors, a virtual goal for the consumer based upon the customer's financial (and/or credit card) activity; and/or (vi) presenting, via the one or more processors, the virtual goal on a display of the mobile device for the customer's review.

Detecting, via one or more processors (such as one or more processors associated with a mobile device), that a credit card or other financial transaction has occurred for a credit card or virtual financial account associated with a customer may include (a) receiving or detecting, via the one or more processors (such as a processor associated with a mobile device), a wireless communication or data transmission sent from a transceiver on a smart credit card (e.g., a credit card having a transceiver, processor, and/or memory unit mounted thereon); (b) detecting or determining, via the one or more processors (such as a processor associated with a mobile device), that an e-wallet or financial (or virtual credit card) transaction has occurred, such as detecting or determining that a financial transaction has occurred via a NFC (Near Field Communication), Bluetooth, or other wireless communication technique involving wireless communication or data transmission between a customer's mobile device and a merchant's computing device; (c) receiving, via the one or more processors (such as a processor associated with a mobile device), a wireless communication or data transmission from a remote server (such as a financial services provider or server associated with a credit card or other financial account) that a customer has conducted a financial transaction associated with their credit card or other financial account, such as a debit account; and/or (d) detecting or determining, via the one or more processors (such as a processor associated with a mobile device), that a credit card or other financial account transaction has occurred by remotely accessing a remote server (such as a financial services provider or server associated with a credit card or other financial account) having financial transaction information of the customer.

The method may include determining, via the one or more processors, upgraded financial and/or insurance products that the customer may qualify for based upon their financial transactions, financial behavior, updated financial account balances or information, credit courses completed, current credit score, time in the Credit Coach program, increased wages, changes in marital status, age, payment history (such as timely payment of one or more loans or bills), following recommended financial-related course of action, following financial tips, etc. Upgraded financial services or products offered may relate to better financing terms on auto, home, personal, or other loans. Upgraded insurance products may include lower premiums or higher discounts on auto, home, life, renters, personal articles, or other types of insurance. The method may include, via the one or more processors, offering the upgraded financial and/or insurance products to the customer for their review and/or approval. Additionally or alternatively, the method may include automatically applying the upgraded financial or insurance product pricing to the customer's account or accounts, such as automatically applying lower rates for auto or home loans, or lower premiums to insurance products.

The method may include, via one or more processors: generating an upgraded financial or insurance product based upon the financial transactions of the customer, financial account balances, and/or an updated credit score of the customer; and/or displaying the upgraded financial or insurance product on a mobile device display for customer review, approval, or modification. The upgraded financial product may include a lower interest rate for a home, auto, or personal loan. The upgraded insurance product may include a higher insurance product discount or a lower insurance product premium, the insurance product being auto, home, renters, personal articles, or life insurance.

The method may determine that an upgraded financial or insurance product is available to a customer, via one or more processors. The one or more processors may detect or determine that (i) a customer financial account balance has reached a predetermined level (such as $1,000); (ii) their credit score has reach a predetermined level (such as 600 or 700); (iii) their credit card balance has reached a certain level left to be paid, such as ($100 or $1000); (iv) that they have timely paid their financial services (e.g., loans) or insurance product premiums for a certain amount of time (such as six months or a year); and/or other factors. The processor(s) may compare certain current financial accounts of the customer with pre-determined levels or scores stored in a memory unit, such as predetermined account balance levels, credit scores, credit card balances, etc.

In another aspect, a computer-implemented method of providing credit coaching may be provided. The method may include (1) detecting or determining, via one or more processors (such as one or more processors associated with a mobile device), that a trigger event has occurred, the trigger event indicating that a credit card or other financial transaction has occurred for a credit card or virtual financial account associated with a customer; (2) generating, via the one or more processors, credit coaching feedback based upon the credit card or other financial transaction (such as based upon an amount of a purchase, or an amount of money left in financial account); and/or (3) presenting, via the one or more processors, the credit coaching feedback on a display of the mobile device to facilitate providing credit coaching to the customer and/or for the customer to develop good financial habits.

The trigger event may be based upon or triggered by: (a) receiving or detecting, via the one or more processors (such as a processor associated with a mobile device), a wireless communication or data transmission sent from a transceiver on a smart credit card (e.g., a credit card having a transceiver, processor, and/or memory unit mounted thereon); (b) detecting or determining, via the one or more processors (such as a processor associated with a mobile device), that an e-wallet or financial (or virtual credit card) transaction has occurred, such as detecting or determining that a financial transaction has occurred via a NFC (Near Field Communication), Bluetooth, or other wireless communication technique involving wireless communication or data transmission between a customer's mobile device and a merchant's computing device; (c) receiving, via the one or more processors (such as a processor associated with a mobile device), a wireless communication or data transmission from a remote server (such as a financial services provider or server associated with a credit card or other financial account) that a customer has conducted a financial transaction associated with their credit card or other financial account, such as a debit account; and/or (d) detecting or determining, via the one or more processors (such as a processor associated with a mobile device), that a credit card or other financial account transaction has occurred by remotely accessing a remote server (such as a financial services provider or server associated with a credit card or other financial account) having financial transaction information of the customer.

The foregoing computer-implemented methods may include additional, less, or alternate actions, including those discussed elsewhere herein. The foregoing computer-implemented methods may be implemented via one or more local and/or remote processors (such as via a mobile device, and/or via remote servers), or via computer-executable instructions stored on non-transitory computer readable medium or media.

Exemplary Computer System for Credit Coaching

In one aspect, a computer system configured to provide credit coaching may be provided. The computer system may include including one or more processors (such as one or more processors associated with a mobile device) configured to: (1) detect or determine that a credit card or other financial transaction has occurred for a credit card or virtual financial account associated with a customer; (2) generate credit coaching feedback based upon the credit card or other financial transaction (such as based upon an amount of a purchase, or an amount of money left in financial account); and/or (3) present the credit coaching feedback on a display of the mobile device to facilitate providing credit coaching to the customer and/or for the customer to develop good financial habits. The computer system and/or processor(s) may include additional, less, or alternate functionality, including that discussed elsewhere herein.

For instance, the one or more processors may be configured to: (i) generate, access from a memory unit, or retrieve a virtual credit course based upon the customer's financial (and/or credit card) activity; and/or (ii) present the virtual credit course on a display of the mobile device for the customer's review. The one or more processors may be configured to: (iii) generate a credit score and/or usability ratings based upon the customer's financial (and/or credit card) activity; and/or (iv) present the credit score and/or usability ratings on a display of the mobile device for the customer's review. The one or more processors may be configured to: (v) generate virtual goal for the consumer based upon the customer's financial (and/or credit card) activity; and/or (vi) present the virtual goal on a display of the mobile device for the customer's review.

Detecting, via one or more processors (such as one or more processors associated with a mobile device), that a credit card or other financial transaction has occurred for a credit card or virtual financial account associated with a customer may include the one or more processors being configured to: (a) receive or detect a wireless communication or data transmission sent from a transceiver on a smart credit card (e.g., a credit card having a transceiver, processor, and/or memory unit mounted thereon); (b) detect or determine that an e-wallet or financial (or virtual credit card) transaction has occurred, such as detecting or determining that a financial transaction has occurred via a NFC (Near Field Communication), Bluetooth, or other wireless communication technique involving wireless communication or data transmission between a customer's mobile device and a merchant's computing device; (c) receive a wireless communication or data transmission from a remote server (such as a financial services provider or server associated with a credit card or other financial account) that a customer has conducted a financial transaction associated with their credit card or other financial account, such as a debit account; and/or (d) detect or determine that a credit card or other financial account transaction has occurred by remotely accessing a remote server (such as a financial services provider or server associated with a credit card or other financial account) having financial transaction information of the customer.

The one or more processors may be configured to: generate an upgraded financial or insurance product based upon the financial transactions of the customer, financial account balances, and/or an updated credit score of the customer; and/or display the upgraded financial or insurance product on a mobile device display for customer review, approval, or modification. The upgraded financial product may include a lower interest rate for a home, auto, or personal loan. The upgraded insurance product may include a higher insurance product discount or a lower insurance product premium, the insurance product being auto, home, renters, personal articles, or life insurance.

The one or more processors may retrieve or access current customer financial information, such as current credit scores; credit card balances; financial or bank account balances; bill payment history; loan payment history; and/or other current financial information. The one or more processors may compare the current customer financial with pre-determined threshold amounts of acceptable financial amounts, such as acceptable credit scores; credit card balances; financial or bank account balances; bill payment history; loan payment history; etc. Based upon the comparisons, the one or more processors may generate or determine one or more upgraded financial or insurance products, such as reduced interest rates for credit cards or vehicle loans, or reduced insurance premiums, as discussed elsewhere herein.

Exemplary User Interface for Providing Credit Coaching

In one aspect, a graphical user interface for providing credit coaching to a customer may be provided. The graphical user interface may include (such as depicted by FIGS. 5 and 6) may include (1) presenting updated or current financial balance amount associated with one or more financial and/or credit card accounts, such as displaying an icon associated with a checking or credit card account that includes current financial balance information; (2) presenting an updated list of recent financial transactions conducted by the customer, the list including a description and an amount of each financial transaction; (3) presenting updated financial goal information, the updated financial goal information being generated and/or based upon one or more recent financial transactions conducted by the customer; and/or (4) presenting an updated financial utilization rate, the updated financial utilization rated being generated and/or based upon one or more recent financial transactions conducted by the customer to facilitate providing credit coaching to the customer and/or encouraging good financial behavior. The graphical user interface may also include presenting financial related messages to the customer, the financial related messages being generated, or based upon, one or more recent financial transactions conducted by the customer, wherein the financial related messages include expense alerts, inactivity alerts, payment due alerts, and/or utilization rate alerts. The user interface may include generating and/or presenting additional, less, or alternate credit coaching information, such as that discussed elsewhere herein.

Exemplary Mobile Device Configured for Credit Coaching

In one aspect, a mobile device application for providing credit coaching may be provided. The application may include computer-executable instructions stored on a non-transitory computer-readable medium. The computer instructions may direct the mobile device to: (1) detect or determine that a trigger event has occurred, the trigger event indicating that a credit card or other financial transaction has occurred for a credit card or virtual financial account associated with a customer; (2) generate credit coaching feedback based upon the credit card or other financial transaction (such as based upon an amount of a purchase, or an amount of money left in financial account); and/or (3) present the credit coaching feedback on a display of the mobile device to facilitate providing credit coaching to the customer and/or for the customer to develop good financial habits.

The trigger event may be based upon or triggered by computer instructions stored on non-transitory computer-readable medium or media that direct: (i) receiving or detecting, via the one or more processors (such as a processor associated with a mobile device), a wireless communication or data transmission sent or transmitted from a transceiver on a smart credit card (e.g., a credit card having a transceiver, processor, and/or memory unit mounted thereon); (ii) detecting or determining, via the one or more processors (such as a processor associated with a mobile device), that an e-wallet or financial (or virtual credit card) transaction has occurred, such as detecting or determining that a financial transaction has occurred via a NFC (Near Field Communication), Bluetooth, or other wireless communication technique involving wireless communication or data transmission between a customer's mobile device and a merchant's computing device; (iii) receiving, via the one or more processors (such as a processor associated with a mobile device), a wireless communication or data transmission from a remote server (such as a financial services provider or server associated with a credit card or other financial account) that a customer has conducted a financial transaction associated with their credit card or other financial account, such as a debit account; and/or (iv) detecting or determining, via the one or more processors (such as a processor associated with a mobile device), that a credit card or other financial account transaction has occurred by remotely accessing a remote server (such as a financial services provider or server associated with a credit card or other financial account) having financial transaction information of the customer. The mobile device may include additional, less, or alternate functionality, including that discussed elsewhere herein.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this patent application are not intended to be construed under 35 U.S.C. § 112(f) unless traditional means-plus-function language is expressly recited, such as "means for" or "step for" language being explicitly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A computer-implemented method of providing educational messages to a consumer, the method comprising:
issuing, via one or more processors, a line of credit to the consumer;
electronically transmitting, via the one or more processors, a credit education course to a mobile computing device of the consumer for display on the mobile computing device, wherein the credit education course includes a knowledge test component and an educational component, wherein the educational component is configured to present a plurality of financial topics related to a general education on credit, and wherein the knowledge test component is configured to test the consumer on the plurality of financial topics presented by the educational component;
determining, via the one or more processors, successful completion of the credit education course by the consumer by detecting that (i) the credit education course was displayed on the mobile computing device and (ii) the knowledge test component was completed and electronically submitted;
electronically transmitting, via the one or more processors in response to the determination, a message to a credit issuing institution for the line of credit to initiate an activation procedure for the line of credit;
processing, via the one or more processors, a first transaction payable on the line of credit;
retrieving, via one or more processors, banking data for at least one financial account associated with the line of credit;
comparing, via the one or more processors, transaction data associated with the first transaction to (i) a credit limit of the line of credit and (ii) an available balance of the at least one financial account associated with the consumer;
generating, via the one or more processors based upon the comparison, a credit message for the line of credit; and
instructing a mobile computing device associated with the consumer to display, via the one or more processors, the credit message on the mobile computing device in real time to facilitate providing credit coaching to the consumer.

2. The method of claim 1, wherein issuing the line of credit comprises issuing a payment card.

3. The method of claim 1 further comprising establishing, via the one or more processors, financial goals for the line of credit based upon consumer financial goals.

4. The method of claim 1 further comprising establishing, via the one or more processors, financial goals for the line of credit based upon financial goals provided by an educational server.

5. A mobile computing device, comprising:
a display;
a network interface controller (NIC);
non-transitory memory configured to store computer-executable instructions therein; and
a processor coupled to the display and the NIC, and configured to gain access to the non-transitory memory and execute the computer-executable instructions, causing the processor to:
electronically receive a credit education course and present the credit education course on the display, wherein the credit education course includes a knowledge test component and an educational component, wherein the educational component is configured to present a plurality of financial topics related to a general education on credit, and wherein the knowledge test component is configured to test the consumer on the plurality of financial topics presented by the educational component;
determine successful completion of the credit education course by the consumer by detecting that (i) the credit education course was presented on the display and (ii) the knowledge test component was completed and electronically submitted;
electronically transmit a course completion message in response to the determination, through the NIC, to a credit issuing institution for a line of credit to initiate an activation procedure for the line of credit;
receive transaction data from the credit issuing institution through the NIC, the transaction data representing a first transaction payable on the line of credit;
retrieve banking data through the NIC for at least one financial account associated with the line of credit;
compare the transaction data associated with the first transaction to (i) a credit limit of the line of credit and (ii) an available balance of the at least one financial account associated with the consumer;
generate, based upon the comparison, a credit message for the line of credit; and
present, in real time, the credit message on the display, to facilitate providing credit coaching to the consumer.

6. The mobile computing device of claim 5 further comprising a near field communication (NFC) device configured to transmit a signal to a point-of-sale (POS) terminal to authorize the first transaction.

7. The mobile computing device of claim 5, wherein the credit message includes a transaction value for the first transaction and the available balance of the at least one financial account.

8. The mobile computing device of claim 5, wherein the credit message includes a transaction value for the first transaction and a comparison of the transaction value to the credit limit for the line of credit.

9. The mobile computing device of claim 5, wherein the credit message includes a pay-off date for the line of credit.

10. The mobile computing device of claim 5, wherein the processor is further configured, upon execution of the computer-executable instructions, to receive financial goals, associated with the line of credit, from the consumer.

11. A computer system for providing educational messages, the system comprising:
a payment device associated with a consumer to whom a line of credit is issued;
a point-of-sale (POS) system configured to communicably couple to the payment device to process a first transaction payable on the line of credit; and
an educational server communicably coupled to the POS system over a network and configured to:
electronically transmit a credit education course to a mobile computing device of the consumer for display on the mobile computing device, wherein the credit education course includes a knowledge test component and an educational component, wherein the educational component is configured to present a plurality of financial topics related to a general education on credit, and wherein the knowledge test component is configured to test the consumer on the plurality of financial topics presented by the educational component;
determine, via the one or more processors, successful completion of the credit education course by the consumer by detecting that (i) the credit education course was displayed on the mobile computing device and (ii) the knowledge test component was completed and electronically submitted;
initiate an activation procedure for the line of credit upon receipt of an indication from the mobile computing device in response to determining successful completion of the credit education course;
receive transaction data for the first transaction from the POS system;
retrieve banking data for at least one financial account associated with the line of credit;
compare the transaction data associated with the first transaction to (i) a credit limit of the line of credit and (ii) an available balance of the at least one financial account associated with the consumer;
generate, based upon the comparison, a credit message for the line of credit; and
instruct the mobile computing device to display the credit message on the mobile computing device in real time to facilitate providing credit coaching to the consumer.

12. The system of claim 11, wherein the payment device is the mobile computing device, the mobile computing device configured to communicate data representing the line of credit to the POS system for processing the first transaction.

13. The system of claim 11, wherein the payment device comprises a payment card.

14. The mobile computing device of claim 5, wherein the processor is further configured, upon execution of the computer-executable instructions, to:
generate an interactive user interface on the display, wherein the interactive user interface includes:
a first display area that includes interactive graphic representations associated with credit score information of the consumer, the first display area including a selectable icon electronically linked to credit report information, wherein the selectable icon is configured to display, in response to user interaction with the selectable icon, at least one credit report associated with the consumer; and
a second display area below the first display area, the second display area including graphical representations for credit card information associated with the issued line of credit, a plurality of interactive icons, each of the plurality of interactive icons electronically linked to a respective detailed record associated with the issued line of credit.

\* \* \* \* \*

UNITED STATES PATENT AND TRADEMARK OFFICE
CERTIFICATE OF CORRECTION

PATENT NO. : 10,504,385 B1
APPLICATION NO. : 15/191083
DATED : December 10, 2019
INVENTOR(S) : Harris et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 283 days.

Signed and Sealed this
Twenty-fourth Day of November, 2020

Andrei Iancu
*Director of the United States Patent and Trademark Office*